US011805272B2

(12) United States Patent
Poirier et al.

(10) Patent No.: US 11,805,272 B2
(45) Date of Patent: Oct. 31, 2023

(54) PREDICTOR CANDIDATES FOR MOTION COMPENSATION

(71) Applicant: InterDigital VC Holdings, Inc., Wilmington, DE (US)

(72) Inventors: Tangi Poirier, Cesson-Sevigne (FR); Antoine Robert, Cesson-Sevigne (FR); Fabrice Leleannec, Cesson-Sevigne (FR)

(73) Assignee: InterDigital Patent Holdings, Inc., Wilmington, DE (US)

( * ) Notice: Subject to any disclaimer, the term of this patent is extended or adjusted under 35 U.S.C. 154(b) by 0 days.

(21) Appl. No.: 16/753,045

(22) PCT Filed: Oct. 4, 2018

(86) PCT No.: PCT/US2018/054300
§ 371 (c)(1),
(2) Date: Apr. 2, 2020

(87) PCT Pub. No.: WO2019/070933
PCT Pub. Date: Apr. 11, 2019

(65) Prior Publication Data
US 2020/0288163 A1    Sep. 10, 2020

(30) Foreign Application Priority Data

Oct. 5, 2017 (EP) .................................. 17306335

(51) Int. Cl.
*H04N 19/147*   (2014.01)
*H04N 19/52*    (2014.01)
(Continued)

(52) U.S. Cl.
CPC ........... *H04N 19/52* (2014.11); *H04N 19/147* (2014.11); *H04N 19/159* (2014.11);
(Continued)

(58) Field of Classification Search
CPC .... H04N 19/52; H04N 19/147; H04N 19/159; H04N 19/176; H04N 19/56; H04N 19/567
See application file for complete search history.

(56) References Cited

U.S. PATENT DOCUMENTS

| 2018/0098063 A1* | 4/2018 | Chen ............... H04N 19/105 |
| 2018/0192047 A1  | 7/2018 | Lv et al. |
| 2018/0205965 A1  | 7/2018 | Chen et al. |

FOREIGN PATENT DOCUMENTS

| CN | 105163116 A | 12/2015 |
| CN | 106559669 A | 4/2017 |

(Continued)

OTHER PUBLICATIONS

Anonymous, "Affine transform prediction for next generation video coding", Study Group 16—Contribution 1016, Huawei Technologies Co., Ltd., International Telecommunication Union Telecommunication Standardization Sector, Study Period 2013-2016, COM xxx-C1016-E, Oct. 2015, 11 pages.

(Continued)

*Primary Examiner* — Dave Czekaj
*Assistant Examiner* — Berteau Joisil
(74) *Attorney, Agent, or Firm* — CONDO ROCCIA KOPTIW LLP

(57) ABSTRACT

Different implementations are described for determining a set of predictor candidates for affine merge coding mode from neighboring blocks for motion compensation of a picture block based on a motion model for a video content encoder or decoder.

22 Claims, 14 Drawing Sheets

(51) Int. Cl.
  H04N 19/159 (2014.01)
  H04N 19/176 (2014.01)
  H04N 19/56 (2014.01)
  H04N 19/567 (2014.01)
(52) U.S. Cl.
  CPC ........... H04N 19/176 (2014.11); H04N 19/56 (2014.11); H04N 19/567 (2014.11)

(56) References Cited

FOREIGN PATENT DOCUMENTS

| | | | | |
|---|---|---|---|---|
| EP | 3264762 | A1 | 1/2018 | |
| EP | 3422720 | A1 * | 1/2019 | ............. H04N 19/52 |
| WO | 2016141609 | A1 | 9/2016 | |
| WO | 2017118409 | A1 | 7/2017 | |
| WO | WO 2017148345 | A1 | 9/2017 | |
| WO | 2019002215 | A1 | 1/2019 | |

OTHER PUBLICATIONS

Chen et al., "Algorithm Description of Joint Exploration Test Model 5 (JEM 5)", Joint Video Exploration Team (JVET) of ITU-T SG 16 WP 3 and ISO/IEC JTC 1/SC 29/WG 11, Document JVET-E1001-v2, 5th meeting, Geneva, Switzerland, Jan. 12, 2017, 41 pages.

Chen et al., "Algorithm Description of Joint Exploration Test Model 2", Joint Video Exploration Team (JVET) of ITU-T SG16 WP3 and ISO/IEC JTC1/SC29/WG11. Document: JVET-81001 v3, 2nd Meeting, San Diego, California, USA, Feb. 20, 2016, 32 pages.

Chen et al., "Algorithm Description of Joint Exploration Test Model 6 (JEM 6)", Joint Video Exploration Team (JVET) of ITU-T SG 16 WP 3 and ISO/IEC JTC 1/SC 29/WG 11, Document JVET-F1001-v2, 6th Meeting, Hobart, Australia, Mar. 31, 2017, 49 pages.

Huang et al., "Affine SKIP and DIRECT Modes for Efficient Video Coding", 2012 Conference on Visual Communications and Image Processing, San Diego, California, USA, Nov. 27, 2012, 6 pages.

Li et al., "An Affine Motion Compensation Framework for High Efficiency Video Coding", 2015 IEEE International Symposium on Circuits and Systems (ISCAS), Lisbon, Portugal, May 24, 2015, pp. 525-528.

Anonymous, "Reference software for ITU-T H.265 high efficiency video coding", International Telecommunication Union, ITU-T Telecommunication Standardization Sector of ITU, Series H: Audio-visual and Multimedia Systems, Infrastructure of audiovisual services—Coding of moving video, Recommendation ITU-T H.265.2, Oct. 2014, pp. 1-12.

Chen, et al., "Algorithm Description of Joint Exploration Test Model 7 (JEM 7)", JVET-G1001-V1, Editors, Joint Video Exploration Team (JVET) of ITU-T SG 16 WP 3 and ISO/IEC JTC 1/SC 29/WG 11, 7th Meeting: Torino, IT, Jul. 13-21, 2017, 50 pages.

Chen, et al., "Improved Affine Motion Vector Coding", JVET-D0128, Qualcomm Inc., Joint Video Exploration Team (JVET) of ITU-T SG 16 WP 3 and ISO/IEC JTC 1/SC 29/WG 11, 4th Meeting: Chengdu, CN, Oct. 15-21, 2016, pp. 1-5.

Huawei Technologies, "Affine transform prediction for next generation video coding", ITU-T SG16 Meeting; Dec. 10, 2015-Oct. 23, 2015; Geneva, No. T13-SG16-C-1016, XP030100743, Sep. 29, 2015, pp. 1-11.

Zou, et al., "EE4: Improved Affine Motion Prediction", JVET-D0121, Qualcomm Incorporated, Joint Video Exploration Team (JVET) of ITU-T SG 16 WP 3 and ISO/IEC JTC 1/SC 29/WG 1, 4th Meeting: Chengdu, CN, Oct. 15-21, 2016, pp. 1-5.

\* cited by examiner

PREDICTOR CANDIDATES FOR MOTION COMPENSATION

CROSS REFERENCE TO RELATED APPLICATIONS

This application is the national stage entry under 35 U.S.C. § 371 of International Application PCT/US2018/054300, filed Oct. 4, 2018 which was published in accordance with PCT Article 21(2) on Apr. 11, 2019, in English, and which claims the benefit of European Patent Application No. 17306335, filed Oct. 5, 2017.

TECHNICAL FIELD

At least one of the present embodiments generally relates to, e.g., a method or an apparatus for video encoding or decoding, and more particularly, to a method or an apparatus for selecting a predictor candidate from a set of multiple predictor candidates for motion compensation in inter coding mode (merge mode or AMVP) based on a motion model such as, e.g., an affine model, for a video encoder or a video decoder.

BACKGROUND

To achieve high compression efficiency, image and video coding schemes usually employ prediction, including motion vector prediction, and transform to leverage spatial and temporal redundancy in the video content. Generally, intra or inter prediction is used to exploit the intra or inter frame correlation, then the differences between the original image and the predicted image, often denoted as prediction errors or prediction residuals, are transformed, quantized, and entropy coded. To reconstruct the video, the compressed data are decoded by inverse processes corresponding to the entropy coding, quantization, transform, and prediction.

A recent addition to high compression technology includes using a motion model based on affine modeling. In particular, affine modeling is used for motion compensation for encoding and decoding of video pictures. In general, affine modeling is a model using at least two parameters such as, e.g., two control point motion vectors (CPMVs) representing the motion at the respective corners of a block of picture, that allows deriving a motion field for the whole block of a picture to simulate, e.g., rotation and homothety (zoom). However, the set of control point motion vectors (CPMVs) potentially used as predictor in Merge mode is limited. Therefore, a method that would increase the overall compression performance of the considered high compression technology by improving the performance of the motion model used in Affine Merge and Advanced Motion Vector Prediction (AMVP) modes is therefore desirable.

SUMMARY

The purpose of the invention is to overcome at least one of the disadvantages of the prior art. For this purpose, according to a general aspect of at least one embodiment, a method for video encoding is presented, comprising: determining, for a block being encoded in a picture, at least one spatial neighboring block, determining, for the block being encoded, a set of predictor candidates for inter coding mode based on the at least one spatial neighboring block, wherein a predictor candidate comprises one or more control point motion vectors and one reference picture; determining, for the block being encoded and for each predictor candidate, a motion field based on a motion model and on the one or more control point motion vectors of the predictor candidate, wherein the motion field identifies motion vectors used for prediction of sub-blocks of the block being encoded; selecting a predictor candidate from the set of predictor candidates based on a rate distortion determination between predictions responsive to the motion field determined for each predictor candidate; encoding the block based on the motion field for the selected predictor candidate; and encoding an index for the selected predictor candidate from the set of predictor candidates. The one or more control point motion vectors and the reference picture are used for prediction of the block being encoded based on motion information associated to the block.

According to another general aspect of at least one embodiment, a method for video decoding is presented, comprising: receiving, for a block being decoded in a picture, an index corresponding to a particular predictor candidate among a set of predictor candidates for inter coding mode; determining, for the block being decoded, at least one spatial neighboring block; determining, for the block being decoded, the set of predictor candidates for inter coding mode based on the at least one spatial neighboring block, wherein a predictor candidate comprises one or more control point motion vectors and one reference picture; determining, for the particular predictor candidate, one or more corresponding control point motion vectors for the block being decoded; determining for the particular predictor candidate, based on the one or more corresponding control point motion vectors, a corresponding motion field based on a motion model, wherein the corresponding motion field identifies motion vectors used for prediction of sub-blocks of the block being decoded; and decoding the block based on the corresponding motion field.

According to another general aspect of at least one embodiment, an apparatus for video encoding is presented, comprising: means for determining, for a block being encoded in a picture, at least one spatial neighboring block; means for determining, for a block being encoded, a set of predictor candidates for inter coding mode based on the at least one spatial neighboring block, wherein a predictor candidate comprises one or more control point motion vectors and one reference picture; means for selecting a predictor candidate from the set of predictor candidates; means for determining for the block being encoded and for each predictor candidate, a motion field based on a motion model and based on the one or more control point motion vectors of the predictor candidate, wherein the motion field identifies motion vectors used for prediction of sub-blocks of the block being encoded; means for selecting a predictor candidate from the set of predictor candidates based on a rate distortion determination between predictions responsive to the motion field determined for each predictor candidate; means for encoding the block based on the corresponding motion field for the selected predictor candidate from the set of predictor candidates; and means for encoding an index for the selected predictor candidate from the set of predictor candidates.

According to another general aspect of at least one embodiment, an apparatus for video decoding is presented, comprising: means for receiving, for a block being decoded in a picture, an index corresponding to a particular predictor candidate among a set of predictor candidates for inter coding mode; means for determining, for the block being decoded, at least one spatial neighboring block; means for determining, for the block being decoded, the set of predictor candidates for inter coding mode based on the at least one spatial neighboring block, wherein a predictor candidate comprises one or more control point motion vectors and one reference picture; means for determining, for the block being decoded, one or more corresponding control point motion vectors from the particular predictor candidate; means for determining for the block being decoded, a motion field based on a motion model and based on the one or more control point motion vectors for the block being decoded, wherein the motion field identifies motion vectors used for prediction of sub-blocks of the block being decoded; and means for decoding the block based on the corresponding motion field.

According to another general aspect of at least one embodiment, an apparatus for video encoding is provided, comprising: one or more processors, and at least one memory. Wherein the one or more processors is configured to: determine, for a block being encoded in a picture, at least one spatial neighboring block; determine, for the block being encoded, a set of predictor candidates for inter coding mode based on the at least one spatial neighboring block, wherein a predictor candidate comprises one or more control point motion vectors and one reference picture; determine, for the block being encoded and for each predictor candidate, a motion field based on a motion model and on the one or more control point motion vectors of the predictor candidate, wherein the motion field identifies motion vectors used for prediction of sub-blocks of the block being encoded; select a predictor candidate from the set of predictor candidates based on a rate distortion determination between predictions responsive to the motion field determined for each predictor candidate; encode the block based on the motion field for the selected predictor candidate; and encode an index for the selected predictor candidate from the set of predictor candidates. The at least one memory is for storing, at least temporarily, the encoded block and/or the encoded index.

According to another general aspect of at least one embodiment, an apparatus for video decoding is provided, comprising: one or more processors and at least one memory. Wherein the one or more processors is configured to: receive, for a block being decoded in a picture, an index corresponding to a particular predictor candidate among a set of predictor candidates for inter coding mode; determine, for the block being decoded, at least one spatial neighboring block; determining, for the block being decoded, the set of predictor candidates for inter coding mode based on the at least one spatial neighboring block, wherein a predictor candidate comprises one or more control point motion vectors and one reference picture; determine, for the particular predictor candidate, one or more corresponding control point motion vectors for the block being decoded; determine, for the particular predictor candidate, based on the one or more corresponding control point motion vectors, a motion field based on a motion model, wherein the motion field identifies motion vectors used for prediction of sub-blocks of the block being decoded; and decoding the block based on the motion field. The at least one memory is for storing, at least temporarily, the decoded block.

According to another general aspect of at least one embodiment, the at least one spatial neighboring block comprises a spatial neighboring block of the block being encoded or decoded among neighboring top-left corner blocks, neighboring top-right corner blocks, and neighboring bottom-left corner blocks.

According to another general aspect of at least one embodiment, motion information associated to at least one of the spatial neighboring blocks comprises non-affine motion information. A non affine motion model is a translational motion model wherein only one motion vector representative of a translation is coded in the model.

According to another general aspect of at least one embodiment, motion information associated to all the at least one spatial neighboring blocks comprises affine motion information.

According to another general aspect of at least one embodiment, the set of predictor candidates comprises unidirectional predictor candidate or bidirectional predictor candidate.

According to another general aspect of at least one embodiment, a method may further comprise: determining a top left list of spatial neighboring blocks of the block being encoded or decoded among neighboring top-left corner blocks, a top right list of spatial neighboring blocks of the block being encoded or decoded among neighboring top-right corner blocks, a bottom left list of spatial neighboring blocks of the block being encoded or decoded among neighboring bottom-left corner blocks; selecting at least one triplet of spatial neighboring blocks, wherein each spatial neighboring block of the triplet respectively belongs to said top left list, said top right list, and said bottom left list and wherein the reference picture being used for prediction of each spatial neighboring block of said triplet is the same; determining, for the block being encoded or decoded, one or more control point motion vectors for top left corner, top right corner, and bottom left corner of the block based on motion information respectively associated to each spatial neighboring blocks of the selected triplet; wherein the predictor candidate comprises the determined one or more control point motion vectors and the reference picture.

According to another general aspect of at least one embodiment, a method may further comprise: evaluating the at least one selected triplets of spatial neighboring blocks according to one or more criteria based on the one or more control point motion vectors determined for the block being encoded or decoded; and wherein the predictor candidates are sorted in the set of predictor candidates for inter coding mode based on the evaluating.

According to another general aspect of at least one embodiment, the one or more criteria comprises a validity check according to equation 3 and cost according to equation 4.

According to another general aspect of at least one embodiment, the cost of a bidirectional predictor candidate is the mean of its first reference picture list related cost and its second reference picture list related cost.

According to another general aspect of at least one embodiment, a method may further comprise: determining a top left list of spatial neighboring blocks of the block being encoded or decoded among neighboring top-left corner blocks, a top right list of spatial neighboring blocks of the block being encoded or decoded among neighboring top-right corner blocks; selecting at least one pair of spatial neighboring blocks, wherein each spatial neighboring block of the pair respectively belongs to said top left list and said top right list and wherein, the reference picture being used for prediction of each spatial neighboring block of said pair is the same; determining, for the block being encoded or decoded, a control point motion vector for the top-left corner of the block based on motion information associated to spatial neighboring blocks of the top left list, a control point motion vector for the top-left corner of the block based on motion information associated to spatial neighboring blocks of the top left list; wherein the predictor candidate comprises said top-left and top-right control point motion vectors and the reference picture.

According to another general aspect of at least one embodiment, a bottom left list is to used instead of the top right list, the bottom left list comprising spatial neighboring blocks of the block being encoded or decoded among neighboring bottom-left corner blocks and wherein bottom-left control point motion vector is determined.

According to another general aspect of at least one embodiment, the motion model is an affine model and the motion field for each position (x, y) inside the block being encoded or decoded is determined by:

$$\begin{cases} v_x = \frac{(v_{2y} - v_{0y})}{h}x - \frac{(v_{2x} - v_{0x})}{h}y + v_{0x} \\ v_y = \frac{(v_{2x} - v_{0x})}{h}x + \frac{(v_{2y} - v_{0y})}{h}y + v_{0y} \end{cases}$$

Wherein $(v_{0x}, v_{0y})$ and $(v_{2x}, v_{2y})$ are the control point motion vectors used to generate the motion field, $(v_{0x}, v_{0y})$ corresponds to the control point motion vector of the top-left corner of the block being encoded or decoded, $(v_{2x}, v_{2y})$ corresponds to the control point motion vector of the bottom-left corner of the block being encoded or decoded and h is the height of the block being encoded or decoded.

According to another general aspect of at least one embodiment, the method may further comprise encoding or retrieving an indication of the motion model used for the block being encoded or decoded, said motion model being based on control point motion vector of the top-left corner and the control point motion vector of the bottom-left corner or said motion model being based on control point motion vector of the top-left corner and the control point motion vector of the top-right corner.

According to another general aspect of at least one embodiment, the motion model used for the block being encoded or decoded is implicitly derived, said motion model being based on control point motion vector of the top-left corner and the control point motion vector of the bottom-left corner or said motion model being based on control point motion vector of the top-left corner and the control point motion vector of the top-right corner.

According to another general aspect of at least one embodiment, decoding or encoding the block based on the corresponding motion field comprises decoding or encoding, respectively, based on predictors for the sub-blocks, the predictors being indicated by the motion vectors.

According to another general aspect of at least one embodiment, the number of the spatial neighboring blocks is at least 5 or at least 7.

According to another general aspect of at least one embodiment, a non-transitory computer readable medium is presented containing data content generated according to the method or the apparatus of any of the preceding descriptions.

According to another general aspect of at least one embodiment, a signal is provided comprising video data generated according to the method or the apparatus of any of the preceding descriptions.

One or more of the present embodiments also provide a computer readable storage medium having stored thereon instructions for encoding or decoding video data according to any of the methods described above. The present embodiments also provide a computer readable storage medium having stored thereon a bitstream generated according to the methods described above. The present embodiments also provide a method and apparatus for transmitting the bitstream generated according to the methods described above. The present embodiments also provide a computer program product including instructions for performing any of the methods described.

DETAILED DESCRIPTION

It is to be understood that the figures and descriptions have been simplified to illustrate elements that are relevant for a clear understanding of the present principles, while eliminating, for purposes of clarity, many other elements found in typical encoding and/or decoding devices. It will be understood that, although the terms first and second may be used herein to describe various elements, these elements should not be limited by these terms. These terms are only used to distinguish one element from another.

Various embodiments are described with respect to the HEVC standard. However, the present principles are not limited to HEVC, and can be applied to other standards, recommendations, and extensions thereof, including for example HEVC or HEVC extensions like Format Range (RExt), Scalability (SHVC), Multi-View (MV-HEVC) Extensions and H.266. The various embodiments are described with respect to the encoding/decoding of a slice. They may be applied to encode/decode a whole picture or a whole sequence of pictures.

Various methods are described above, and each of the methods comprises one or more steps or actions for achieving the described method. Unless a specific order of steps or actions is required for proper operation of the method, the order and/or use of specific steps and/or actions may be modified or combined.

Figure 1:
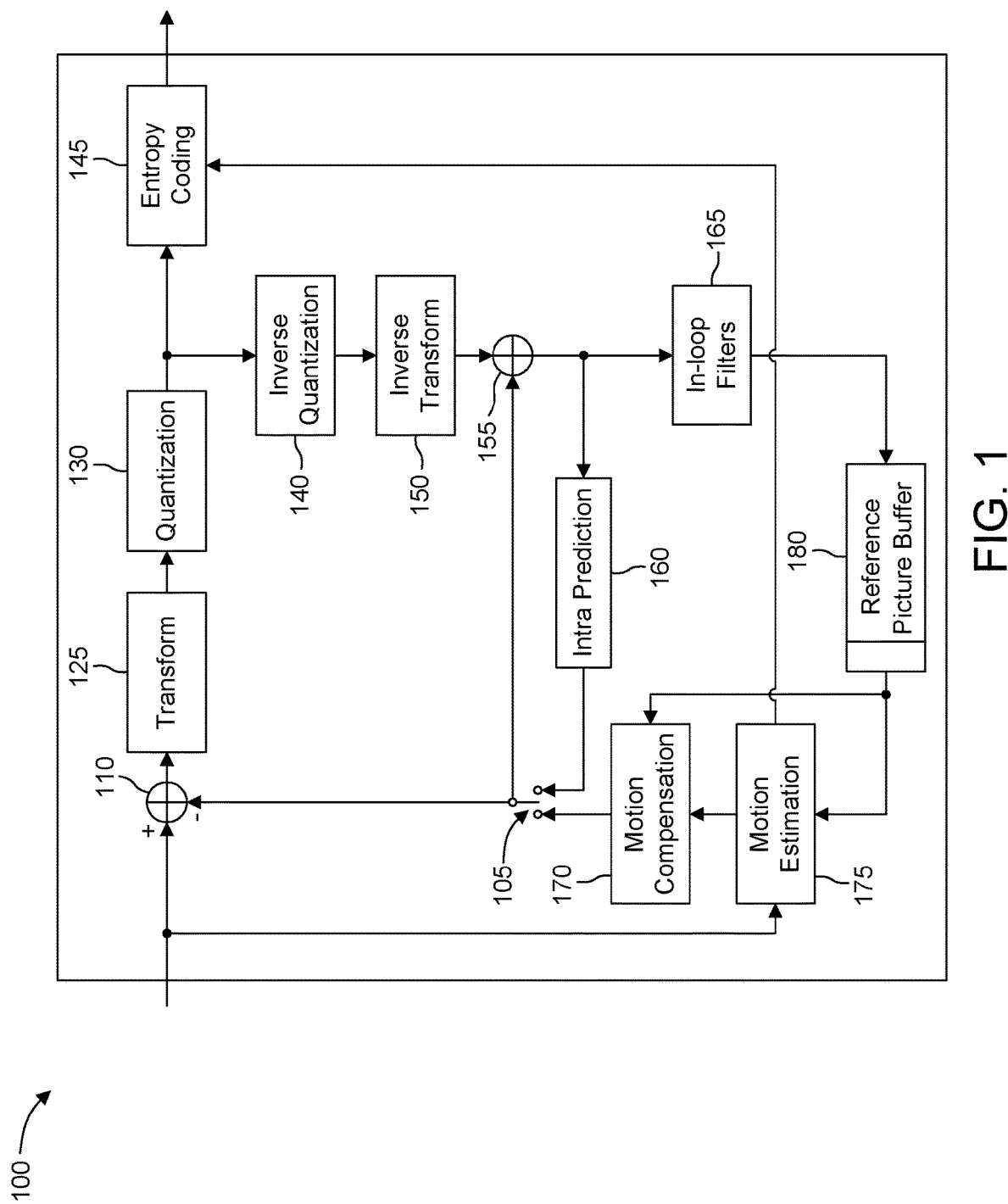
FIG. 1 illustrates a block diagram of an embodiment of an HEVC (High Efficiency Video Coding) video encoder.

FIG. 1 illustrates an exemplary High Efficiency Video Coding (HEVC) encoder 100. HEVC is a compression standard developed by Joint Collaborative Team on Video Coding (JCT-VC) (see, e.g., "ITU-T H.265 TELECOMMUNICATION STANDARDIZATION SECTOR OF ITU (October 2014), SERIES H: AUDIOVISUAL AND MULTIMEDIA SYSTEMS, Infrastructure of audiovisual services—Coding of moving video, High efficiency video coding, Recommendation ITU-T H.265").

In HEVC, to encode a video sequence with one or more pictures, a picture is partitioned into one or more slices where each slice can include one or more slice segments. A slice segment is organized into coding units, prediction units, and transform units.

In the present application, the terms "reconstructed" and "decoded" may be used interchangeably, the terms "encoded" or "coded" may be used interchangeable, and the terms "picture" and "frame" may be used interchangeably. Usually, but not necessarily, the term if) "reconstructed" is used at the encoder side while "decoded" is used at the decoder side.

The HEVC specification distinguishes between "blocks" and "units," where a "block" addresses a specific area in a sample array (e.g., luma, Y), and the "unit" includes the collocated blocks of all encoded color components (Y, Cb, Cr, or monochrome), syntax elements, and prediction data that are associated with the blocks (e.g., motion vectors).

For coding, a picture is partitioned into coding tree blocks (CTB) of square shape with a configurable size, and a consecutive set of coding tree blocks is grouped into a slice. A Coding Tree Unit (CTU) contains the CTBs of the encoded color components. A CTB is the root of a quadtree partitioning into Coding Blocks (CB), and a Coding Block may be partitioned into one or more Prediction Blocks (PB) and forms the root of a quadtree partitioning into Transform Blocks (TBs). Corresponding to the Coding Block, Prediction Block, and Transform Block, a Coding Unit (CU) includes the Prediction Units (PUs) and the tree-structured set of Transform Units (TUs), a PU includes the prediction information for all color components, and a TU includes residual coding syntax structure for each color component. The size of a CB, PB, and TB of the luma component applies to the corresponding CU, PU, and TU. In the present application, the term "block" can be used to refer, for example, to any of CTU, CU, PU, TU, CB, PB, and TB. In addition, the "block" can also be used to refer to a macroblock and a partition as specified in H.264/AVC or other video coding standards, and more generally to refer to an array of data of various sizes.

In the exemplary encoder 100, a picture is encoded by the encoder elements as described below. The picture to be encoded is processed in units of CUs. Each CU is encoded using either an intra or inter mode. When a CU is encoded in an intra mode, it performs intra prediction (160). In an inter mode, motion estimation (175) and compensation (170) are performed. The encoder decides (105) which one of the intra mode or inter mode to use for encoding the CU, and indicates the intra/inter decision by a prediction mode flag. Prediction residuals are calculated by subtracting (110) the predicted block from the original image block.

CUs in intra mode are predicted from reconstructed neighboring samples within the same slice. A set of 35 intra prediction modes is available in HEVC, including a DC, a planar, and 33 angular prediction modes. The intra prediction reference is reconstructed from the row and column adjacent to the current block. The reference extends over two times the block size in the horizontal and vertical directions using available samples from previously reconstructed blocks. When an angular prediction mode is used for intra prediction, reference samples can be copied along the direction indicated by the angular prediction mode.

The applicable luma intra prediction mode for the current block can be coded using two different options. If the applicable mode is included in a constructed list of three most probable modes (MPM), the mode is signaled by an index in the MPM list. Otherwise, the mode is signaled by a fixed-length binarization of the mode index. The three most probable modes are derived from the intra prediction modes of the top and left neighboring blocks.

For an inter CU, the corresponding coding block is further partitioned into one or more prediction blocks. Inter prediction is performed on the PB level, and the corresponding PU contains the information about how inter prediction is performed. The motion information (i.e., motion vector and reference picture index) can be signaled in two methods, namely, "merge mode" and "advanced motion vector prediction (AMVP)".

In the merge mode, a video encoder or decoder assembles a candidate list based on already coded blocks, and the video encoder signals an index for one of the candidates in the candidate list. At the decoder side, the motion vector (MV) and the reference picture index are reconstructed based on the signaled candidate.

Figure 2A:
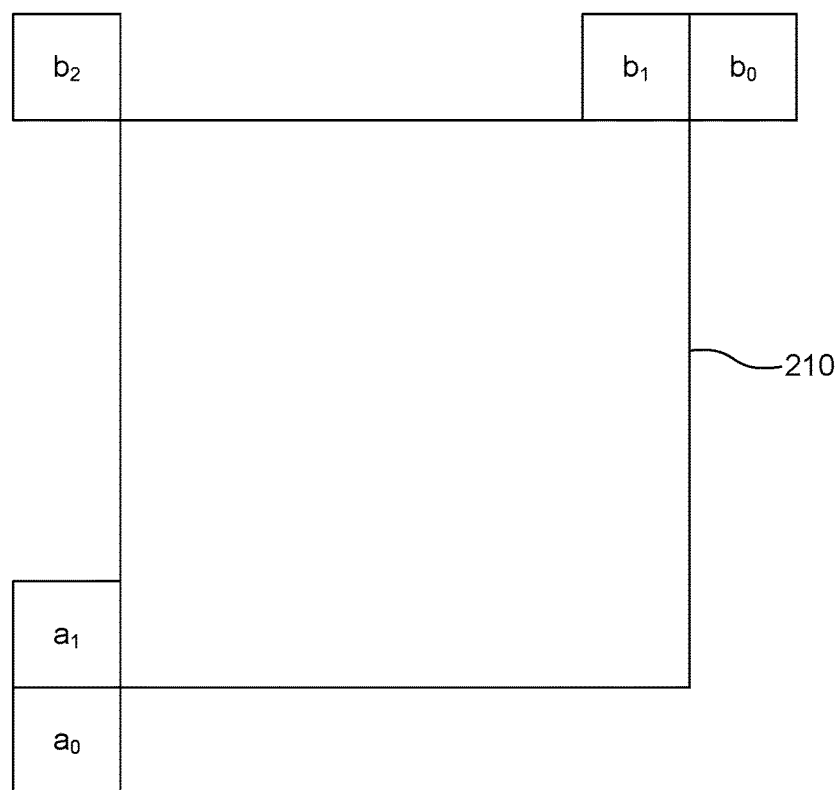
FIG. 2A is a pictorial example depicting HEVC reference sample generation.

The set of possible candidates in the merge mode consists of spatial neighbor candidates, a temporal candidate, and generated candidates. FIG. 2A shows the positions of five spatial candidates $\{a_1, b_1, b_0, a_0, b_2\}$ for a current block 210, wherein $a_0$ and $a_1$ are to the left of the current block, and $b_1$, $b_0$, $b_2$ are at the top of the current block. For each candidate position, the availability is checked according to the order of $a_1, b_1, b_0, a_0, b_2$, and then the redundancy in candidates is removed.

The motion vector of the collocated location in a reference picture can be used for derivation of a temporal candidate. The applicable reference picture is selected on a slice basis and indicated in the slice header, and the reference index for the temporal candidate is set to $i_{ref}=0$. If the POC distance (td) between the picture of the collocated PU and the reference picture from which the collocated PU is predicted from, is the same as the distance (tb) between the current picture and the reference picture containing the collocated PU, the collocated motion vector $mv_{col}$ can be directly used as the temporal candidate. Otherwise, a scaled motion vector, $tb/td*mv_{col}$, is used as the temporal candidate. Depending on where the current PU is located, the collocated PU is determined by the sample location at the bottom-right or at the center of the current PU.

The maximum number of merge candidates, N, is specified in the slice header. If the number of merge candidates is larger than N, only the first N−1 spatial candidates and the temporal candidate are used. Otherwise, if the number of merge candidates is less than N, the set of candidates is filled up to the maximum number N with generated candidates as combinations of already present candidates, or null candidates. The candidates used in the merge mode may be referred to as "merge candidates" in the present application.

If a CU indicates a skip mode, the applicable index for the merge candidate is indicated only if the list of merge candidates is larger than 1, and no further information is coded for the CU. In the skip mode, the motion vector is applied without a residual update.

In AMVP, a video encoder or decoder assembles candidate lists based on motion vectors determined from already coded blocks. The video encoder then signals an index in the candidate list to identify a motion vector predictor (MVP) and signals a motion vector difference (MVD). At the decoder side, the motion vector (MV) is reconstructed as MVP+MVD. The applicable reference picture index is also explicitly coded in the PU syntax for AMVP.

Only two spatial motion candidates are chosen in AMVP. The first spatial motion candidate is chosen from left positions $\{a_0, a_1\}$ and the second one from the above positions $\{b_1, b_0, b_2\}$, while keeping the searching order as indicated in the two sets. If the number of motion vector candidates is not equal to two, the temporal MV candidate can be included. If the set of candidates is still not fully filled, then zero motion vectors are used.

If the reference picture index of a spatial candidate corresponds to the reference picture index for the current PU (i.e., using the same reference picture index or both using long-term reference pictures, independently of the reference picture list), the spatial candidate motion vector is used directly. Otherwise, if both reference pictures are short-term ones, the candidate motion vector is scaled according to the distance (tb) between the current picture and the reference picture of the current PU and the distance (td) between the current picture and the reference picture of the spatial candidate. The candidates used in the AMVP mode may be referred to as "AMVP candidates" in the present application.

For ease of notation, a block tested with the "merge" mode at the encoder side or a block decoded with the "merge" mode at the decoder side is denoted as a "merge" block, and a block tested with the AMVP mode at the encoder side or a block decoded with the AMVP mode at the decoder side is denoted as an "AMVP" block.

Figure 2B:
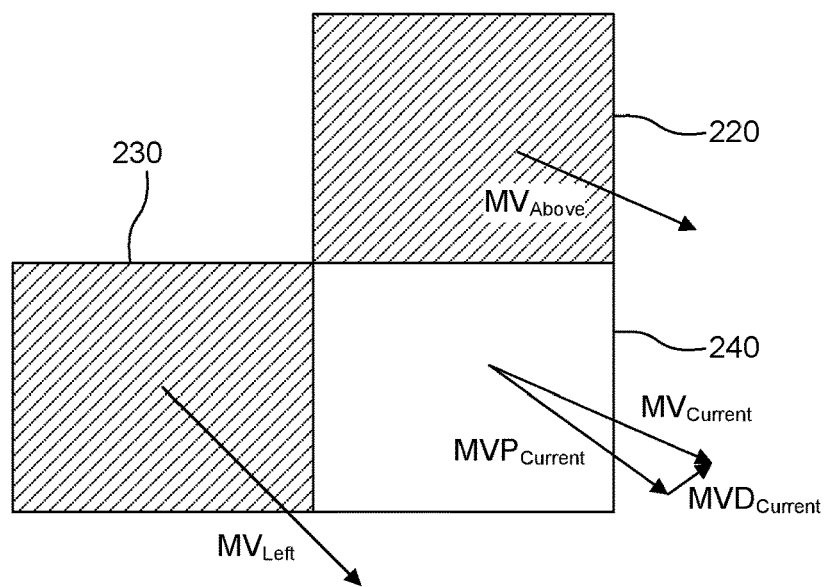
FIG. 2B is a pictorial example depicting intra prediction directions in HEVC.

FIG. 2B illustrates an exemplary motion vector representation using AMVP. For a current block 240 to be encoded, a motion vector ($MV_{current}$) can be obtained through motion estimation. Using the motion vector ($MV_{left}$) from a left block 230 and the motion vector ($MV_{above}$) from the above block 220, a motion vector predictor can be chosen from $MV_{left}$ and $MV_{above}$ as $MVP_{current}$. A motion vector difference then can be calculated as $MVD_{current} = MV_{current} - MVP_{current}$.

Motion compensation prediction can be performed using one or two reference pictures for prediction. In P slices, only a single prediction reference can be used for Inter prediction, enabling uni-prediction for a prediction block. In B slices, two reference picture lists are available, and uni-prediction or bi-prediction can be used. In bi-prediction, one reference picture from each of the reference picture lists is used.

In HEVC, the precision of the motion information for motion compensation is one quarter-sample (also referred to as quarter-pel or ¼-pel) for the luma component and one eighth-sample (also referred to as ⅛-pel) for the chroma components for the 4:2:0 configuration. A 7-tap or 8-tap interpolation filter is used for interpolation of fractional-sample positions, i.e., ¼, ½ and ¾ of full sample locations in both horizontal and vertical directions can be addressed for luma.

The prediction residuals are then transformed (125) and quantized (130). The quantized transform coefficients, as well as motion vectors and other syntax elements, are entropy coded (145) to output a bitstream. The encoder may also skip the transform and apply quantization directly to the non-transformed residual signal on a 4×4 TU basis. The encoder may also bypass both transform and quantization, i.e., the residual is coded directly without the application of the transform or quantization process. In direct PCM coding, no prediction is applied and the coding unit samples are directly coded into the bitstream.

The encoder decodes an encoded block to provide a reference for further predictions. The quantized transform coefficients are de-quantized (140) and inverse transformed (150) to decode prediction residuals. Combining (155) the decoded prediction residuals and the predicted block, an image block is reconstructed. In-loop filters (165) are applied to the reconstructed picture, for example, to perform deblocking/SAO (Sample Adaptive Offset) filtering to reduce encoding artifacts. The filtered image is stored at a reference picture buffer (180).

Figure 3:
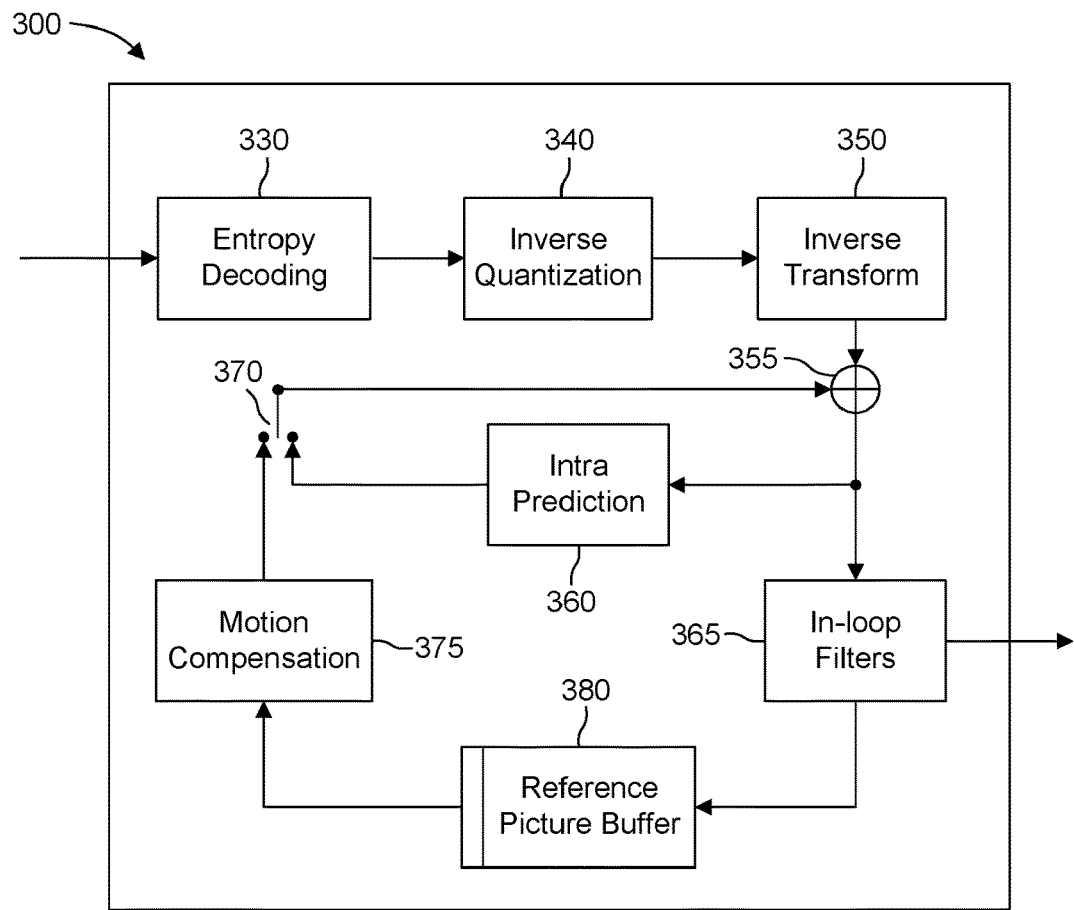
FIG. 3 illustrates a block diagram of an embodiment of an HEVC video decoder.

FIG. 3 illustrates a block diagram of an exemplary HEVC video decoder 300. In the exemplary decoder 300, a bitstream is decoded by the decoder elements as described below. Video decoder 300 generally performs a decoding pass reciprocal to the encoding pass as described in FIG. 1, which performs video decoding as part of encoding video data.

In particular, the input of the decoder includes a video bitstream, which may be generated by video encoder 100. The bitstream is first entropy decoded (330) to obtain transform coefficients, motion vectors, and other coded information. The transform coefficients are de-quantized (340) and inverse transformed (350) to decode the prediction residuals. Combining (355) the decoded prediction residuals and the predicted block, an image block is reconstructed. The predicted block may be obtained (370) from intra prediction (360) or motion-compensated prediction (i.e., inter prediction) (375). As described above, AMVP and merge mode techniques may be used to derive motion vectors for motion compensation, which may use interpolation filters to calculate interpolated values for sub-integer samples of a reference block. In-loop filters (365) are applied to the reconstructed image. The filtered image is stored at a reference picture buffer (380).

Figure 4:
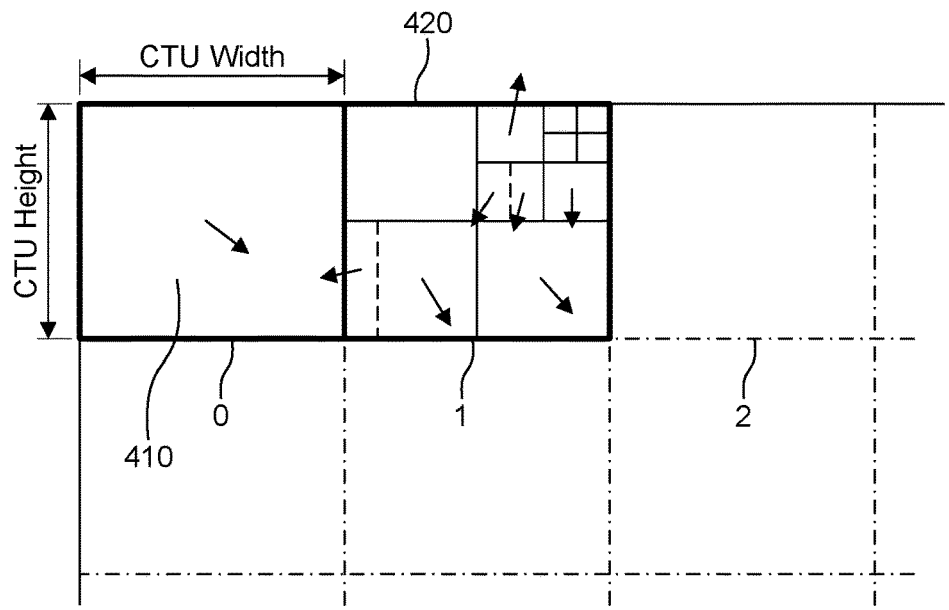
FIG. 4 illustrates an example of Coding Tree Unit (CTU) and Coding Tree (CT) concepts to represent a compressed HEVC picture.
Figure 5:
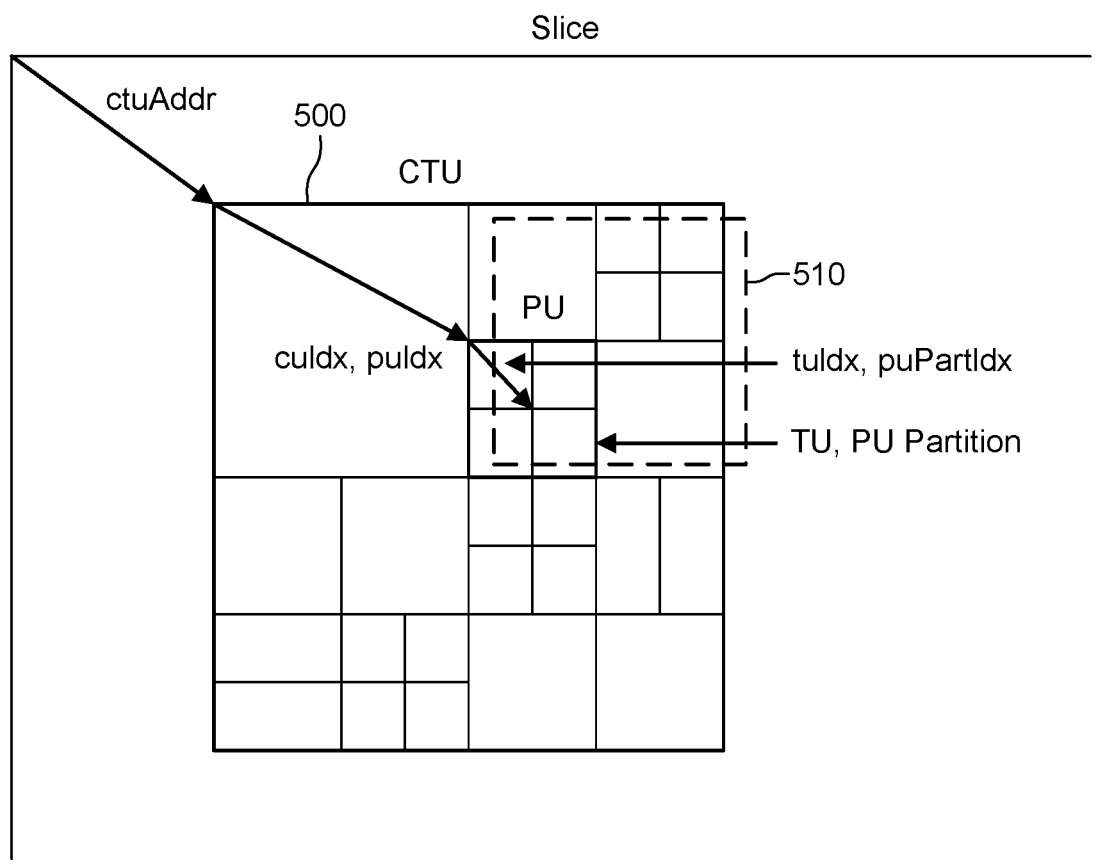
FIG. 5 illustrates an example of divisions of a Coding Tree Unit (CTU) into Coding Units (CUs), Prediction Units (PUs), and Transform Units (TUs).

As mentioned, in HEVC, motion compensated temporal prediction is employed to exploit the redundancy that exists between successive pictures of a video. To do that, a motion vector is associated with each prediction unit (PU). As explained above, each CTU is represented by a Coding Tree in the compressed domain. This is a quad-tree division of the CTU, where each leaf is called a Coding Unit (CU) and is also illustrated in FIG. 4 for CTUs 410 and 420. Each CU is then given some Intra or Inter prediction parameters as prediction information. To do so, a CU may be spatially partitioned into one or more Prediction Units (PUs), each PU being assigned some prediction information. The Intra or Inter coding mode is assigned on the CU level. These concepts are further illustrated in FIG. 5 for an exemplary CTU 500 and a CU 510.

In HEVC, one motion vector is assigned to each PU. This motion vector is used for motion compensated temporal prediction of the considered PU. Therefore, in HEVC, the motion model that links a predicted block and its reference block simply consists of a translation or calculation based on the reference block and the corresponding motion vector.

To make improvements to HEVC, the reference software and/or documentation JEM (Joint Exploration Model) is being developed by the Joint Video Exploration Team (JVET). In one JEM version (e.g., "Algorithm Description of Joint Exploration Test Model 5", Document JVET-E1001_v2, Joint Video Exploration Team of ISO/IEC JTC1/SC29/WG11, 5rd meeting, 12-20 Jan. 2017, Geneva, CH), some further motion models are supported to improve temporal prediction. To do so, a PU can be spatially divided into sub-PUs and a model can be used to assign each sub-PU a dedicated motion vector.

In more recent versions of the JEM (e.g., "Algorithm Description of Joint Exploration Test Model 2", Document JVET-B1001_v3, Joint Video Exploration Team of ISO/IEC JTC1/SC29/WG11, 2rd meeting, 20-26 Feb. 2016, San Diego, USA"), a CU is no longer specified to be divided into PUs or TUs. Instead, more flexible CU sizes may be used, and some motion data are directly assigned to each CU. In this new codec design under the newer versions of JEM, a CU may be divided into sub-CUs and a motion vector may be computed for each sub-CU of the divided CU.

Figure 6:
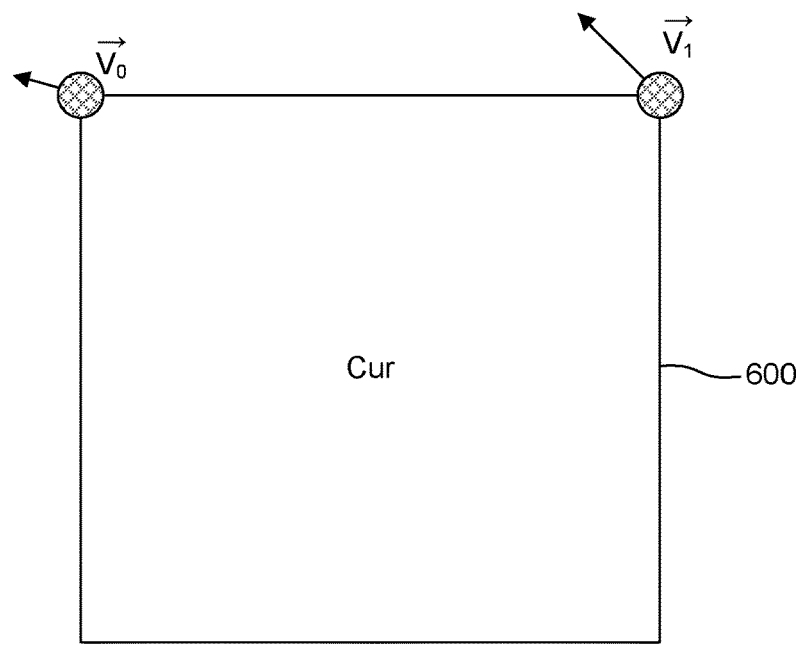
FIG. 6 illustrates an example of an affine model as the motion model used in Joint Exploration Model (JEM).

One of the new motion models introduced in the JEM is the use of an affine model as the motion model to represent the motion vectors in a CU. The motion model used is illustrated by FIG. 6 and is represented by Equation 1 as shown below. The affine motion field comprises the following motion vector component values for each position (x, y) inside the considered block 600 of FIG. 6:

$$\begin{cases} v_x = \frac{(v_{1x} - v_{0x})}{w}x - \frac{(v_{1y} - v_{0y})}{w}y + v_{0x} \\ v_y = \frac{(v_{1y} - v_{0y})}{w}x + \frac{(v_{1x} - v_{0x})}{w}y + v_{0y} \end{cases} \quad \text{Equation 1}$$

affine motion model used to generate the motion field inside a CU for prediction, wherein $\vec{v_0}(v_{0x}, v_{0y})$ and $\vec{v_1}(v_{1x}, v_{1y})$ are the control point motion vectors (CPMVs) used to generate the corresponding motion field, $(v_{0x}, v_{0y})$ corresponds to the control point motion vector of the top-left corner of the block being encoded or decoded, $(v_{1x}, v_{1y})$ corresponds to the control point motion vector of the top-right corner of the block being encoded or decoded, and w is the width of the block being encoded or decoded.

Figure 7:
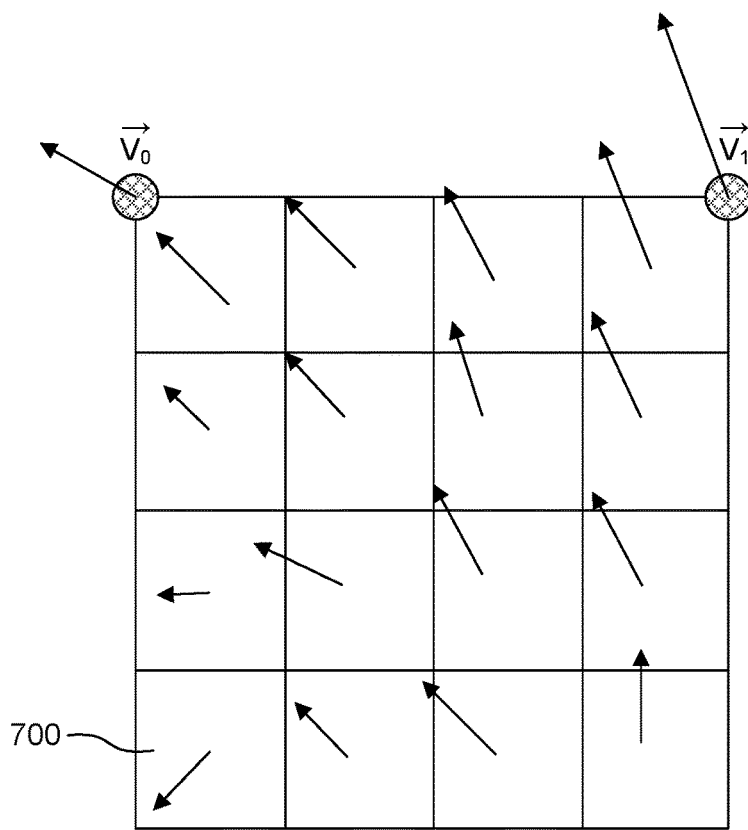
FIG. 7 illustrates an example of 4×4 sub-CU based affine motion vector field used in Joint Exploration Model (JEM).

To reduce complexity, a motion vector is computed for each 4×4 sub-block (sub-CU) of the considered CU 700, as illustrated in FIG. 7. An affine motion vector is computed from the control point motion vectors, for each center position of each sub-block. The obtained MV is represented at 1/16 pel accuracy. As a result, the compensation of a coding unit in the affine mode consists in motion compensated prediction of each sub-block with its own motion vector. These motion vectors for the sub-blocks are shown respectively as an arrow for each of the sub-blocks in FIG. 7.

Affine motion compensation may be used in 2 ways in the JEM: Affine AMVP (AF_AMVP) mode and Affine Merge mode. They are introduced in the following sections.

Figure 8A:
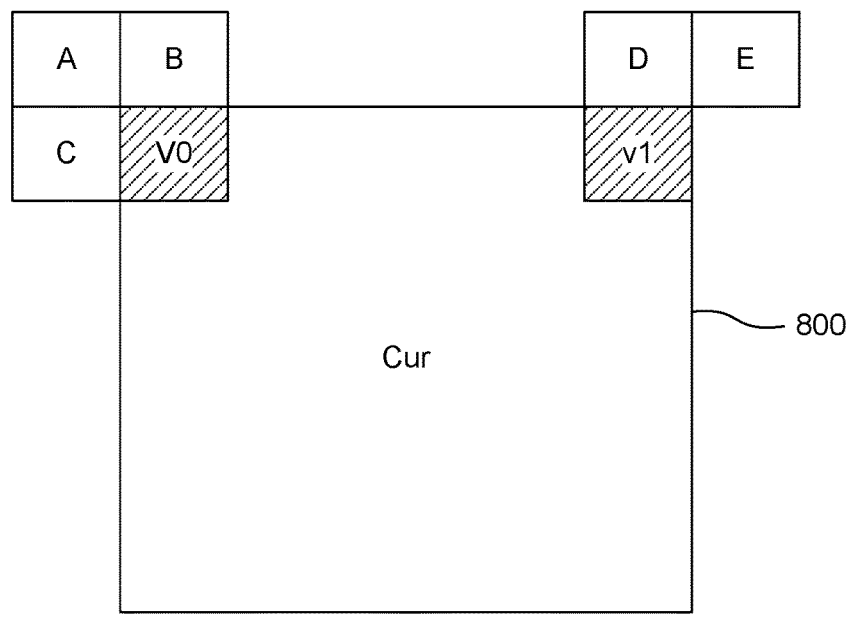
FIG. 8A illustrates an examples of motion vector prediction candidates for Affine Inter CUs.

Affine AMVP mode: A CU in AMVP mode, whose size is larger than 8×8, may be predicted in Affine AMVP mode. This is signaled through a flag in the bit-stream. The generation of the Affine Motion Field for that AMVP CU includes determining control point motion vectors (CPMVs), which are obtained by the encoder or decoder through the addition of a motion vector differential and a control point motion vector prediction (CPMVP). The CPMVPs are a pair of motion vector candidates, respectively taken from the set (A, B, C) and (D, E) illustrated in FIG. 8A for a current CU 800 being encoded or decoded.

Figure 8B:
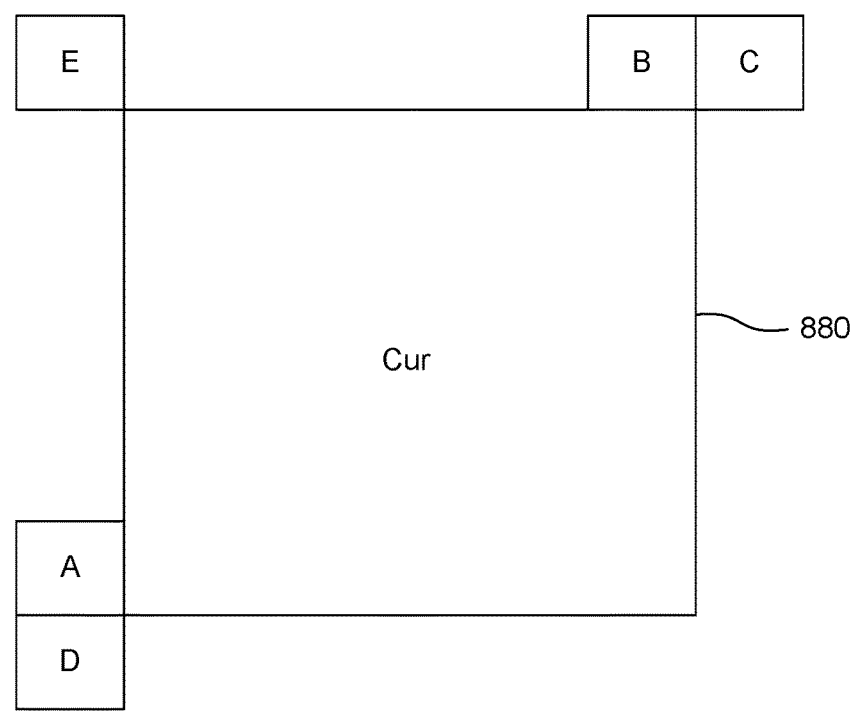
FIG. 8B illustrates an example of motion vector prediction candidates in the Affine Merge mode.

Affine Merge mode: In Affine Merge mode, a CU-level flag indicates if a merge CU employs affine motion compensation. If so, then the first available neighboring CU that has been coded in an Affine mode is selected among the ordered set of candidate positions A, B, C, D, E of FIG. 8B for a current CU 880 being encoded or decoded. Note that this ordered set of candidate positions in JEM is the same as the spatial neighbor candidates in the merge mode in HEVC as shown in FIG. 2A and as explained previously.

Figure 9:
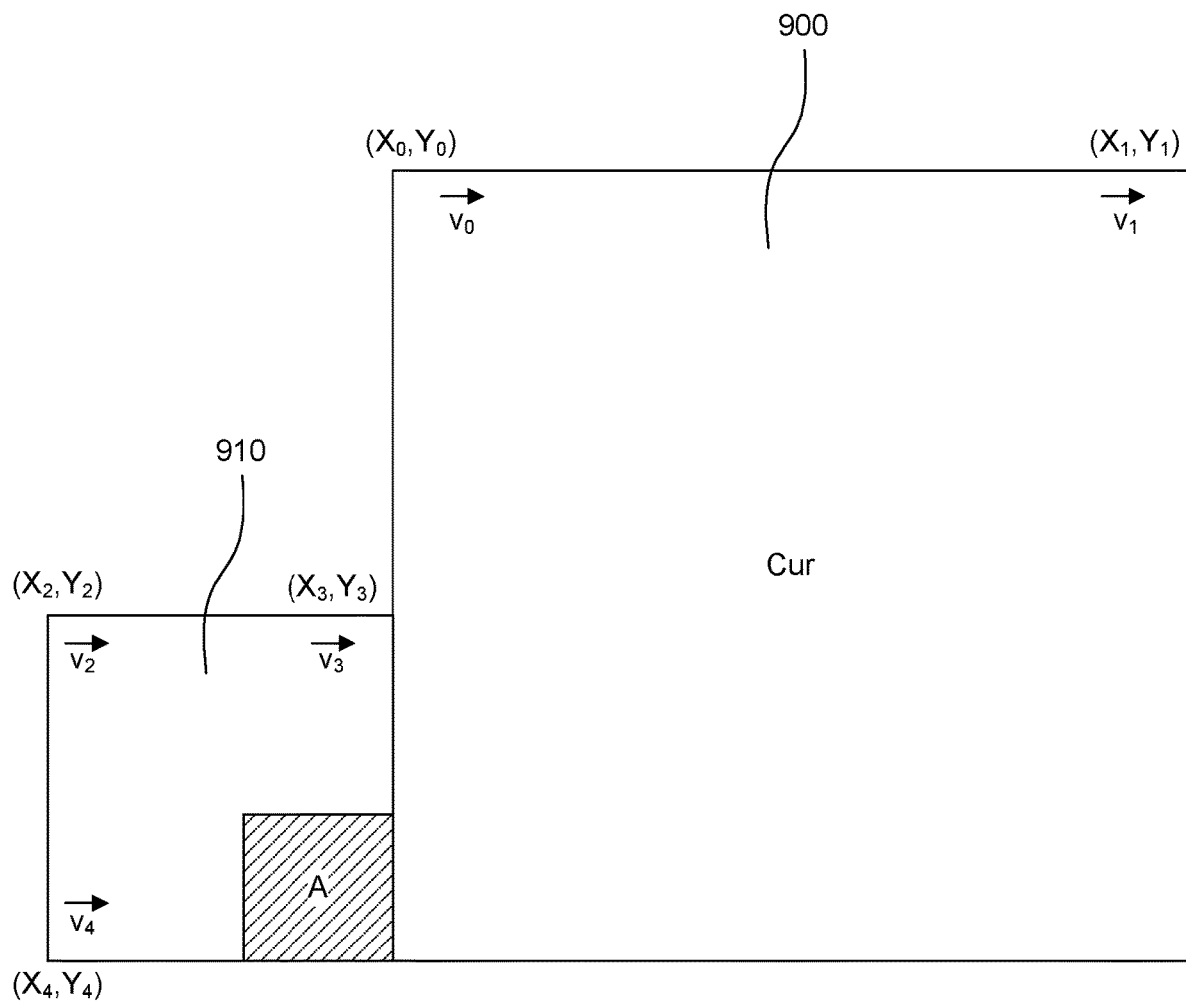
FIG. 9 illustrates an example of spatial derivation of affine control point motion vectors in the case of Affine Merge mode motion model.

Once the first neighboring CU in Affine mode is obtained, then the 3 CPMVs $\vec{v_2}$, $\vec{v_3}$, and $\vec{v_4}$ from the top-left, top-right and bottom-left corners of the neighboring affine CU are retrieved or calculated. For example, FIG. 9 shows that this first determined neighboring CU 910 in Affine mode being in the A position of FIG. 8B for a current CU 900 being encoded or decoded. Based on these three CPMVs of the neighboring CU 910, the two CPMVs of the top-left and top-right corners of the current CU 900 are derived as follows:

$$\vec{v_0} = \vec{v_2} + (\vec{v_4} - \vec{v_2})\left(\frac{Y_{curr} - Y_{neighb}}{H_{neighb}}\right) + (\vec{v_3} - \vec{v_2})\left(\frac{X_{curr} - X_{neighb}}{W_{neighb}}\right) \quad \text{Equation 2}$$

$$\vec{v_1} = \vec{v_0} + (\vec{v_3} - \vec{v_2})\left(\frac{W_{curr}}{W_{neighb}}\right)$$

derivation of CPMVs of the current CU based on the three control-point motion vectors of the selected neighboring CU When the control point motion vectors $\vec{v_0}$ and $\vec{v_1}$ of the current CU are obtained, the motion field inside the current CU being encoded or decoded is computed on a 4×4 sub-CU basis, through the model of Equation 1 as described above in connection with FIG. 6.

Accordingly, a general aspect of at least one embodiment aims to improve the performance of the Affine Merge mode in JEM so that the compression performance of a considered video codec may be improved. Therefore, in at least one embodiment, an improved affine motion compensation apparatus and method are presented for Coding/Decoding Units that are coded in Affine Merge mode. The proposed improved affine mode includes determining a set of predictor candidates in the Affine Merge mode regardless the neighboring CU is coded in Affine mode or not.

As discussed before, in the current JEM, the first neighboring CU coded in Affine mode among the surrounding CUs is selected to predict the affine motion model associated with the current CU being encoded or decoded in Affine Merge mode. That is, the first neighboring CU candidate among the ordered set (A, B, C, D, E) of FIG. 8B that is coded in affine mode is selected to predict the affine motion model of current CU in Affine Merge mode.

Accordingly, at least one embodiment improves the Affine Merge prediction candidate, therefore providing the best coding efficiency when coding the current CU in Affine Merge mode, by creating new motion model candidates from motion vectors of neighbor blocks used as CPMVP. Corresponding new motion model candidates created from motion vectors of neighbor blocks used as CPMVP are also determined when decoding in merge to obtain the predictor from the signaled index. The improvements of this embodiment, at a general level, therefore comprise, for example:

Constructing a set of unidirectional or bidirectional Affine Merge predictor candidates, based on neighboring CU motion information, regardless the neighboring CU is coded in affine mode or not (for encoder/decoder);

Constructing a set of Affine Merge predictor candidates by selecting control point motion vectors from only 2 neighboring blocks, for instance Top-Left (TL) block and Top-Right (TR) or Bottom-Left (BL) (for encoder/decoder);

When evaluating predictor candidate, adding a penalty cost for a unidirectional predictor candidate compare to a bidirectional predictor candidate (for encoder/decoder);

Add neighboring blocks only if neighbors are affine coded (for encoder/decoder).

and/or signaling/decoding an indication of the motion model used for current CU's control point motion vectors predictor (for encoder/decoder).

Although, described for an encoding/decoding method based on merge mode, the present principles also apply to AMVP (ie Affine_Inter) mode. Advantageously, the various embodiments for creation of predictor candidate are unambiguously derivable for Affine AMVP.

The present principles are advantageously implemented in an encoder in the motion estimation module 175 and the motion compensation module 170 of FIG. 1 or in a decoder, in the motion compensation module 275 of FIG. 2.

Figure 10:
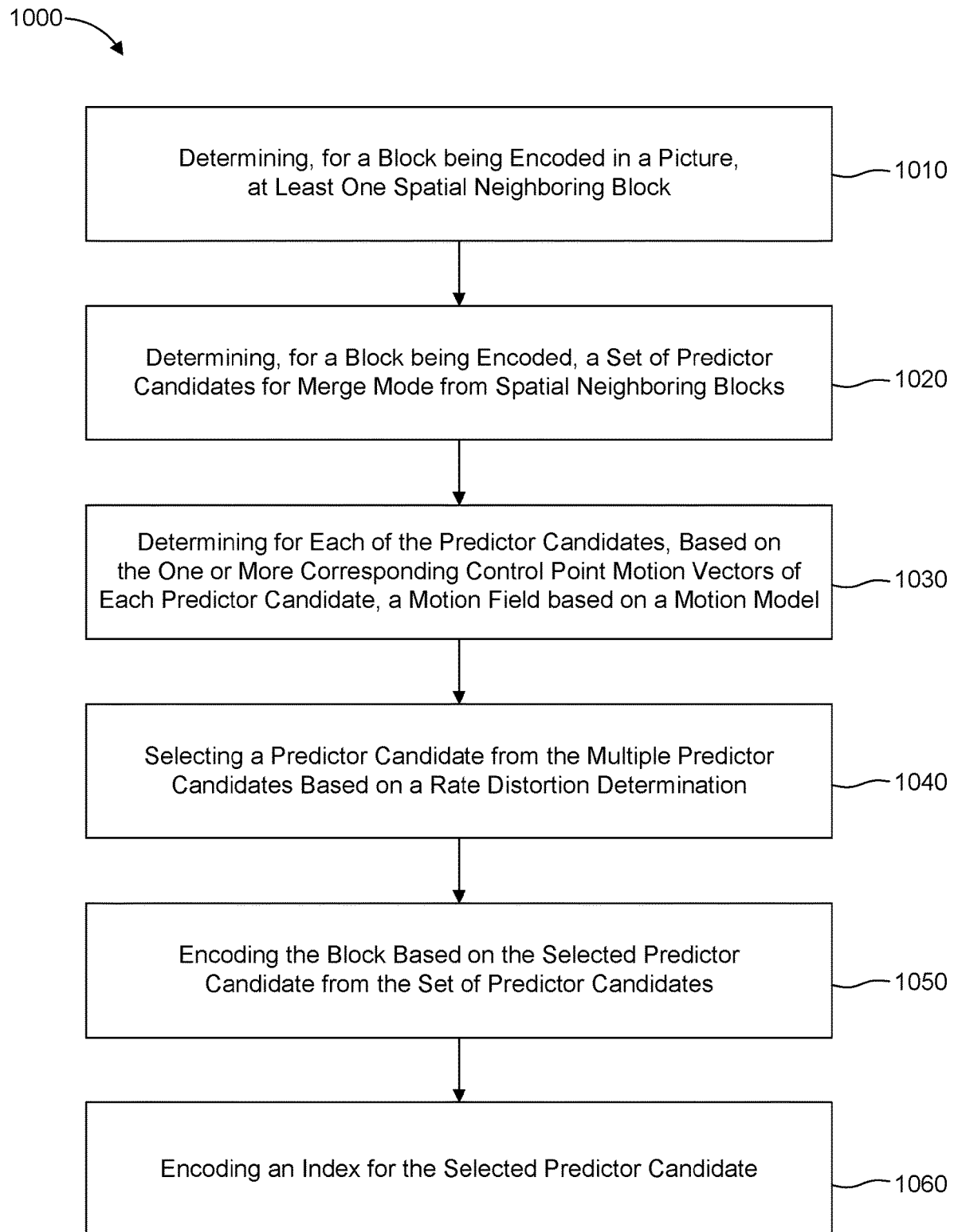
FIG. 10 illustrates an example encoding method according to a general aspect of at least one embodiment.

Accordingly, FIG. 10 illustrates an exemplary encoding method 1000 according to a general aspect of at least one embodiment. At 1010, the method 1000 determines, for a block being encoded in a picture, at least one spatial neighboring block. For instance, as shown on FIG. 12 neighboring blocks of the block CU being encoded among A, B, C, D, E, F, G are determined. At 1020, the method 1000 determines, for a block being encoded in a picture, a set of predictor candidates for affine merge mode from spatial neighboring blocks. Further details for such determining are given below in respect with FIG. 11. While in JEM Affine Merge mode the first neighboring block from the ordered list F, D, E, G, A as represented on FIG. 12. coded in Affine mode is used as predictor, according to a general aspect of the present embodiment, a plurality of predictor candidates is assessed for affine merge mode wherein a neighboring block can be used as predictor candidate regardless the neighboring block is coded in Affine mode or not. According to a particular aspect of the present embodiment, a predictor candidate comprises one or more corresponding control point motion vectors and one reference picture. The reference picture is used for prediction of the at least one spatial neighboring block based on motion compensation respective to the one or more corresponding control point motion vectors. Reference picture and the one or more corresponding control point motion vectors are derived from motion information associated to at least one of the spatial neighboring blocks. Of course, motion compensation prediction can be performed using one or two reference pictures for prediction according to unidirectional or bidirectional prediction. Therefore, two reference picture lists are available for storing motion information from which reference picture and motion vectors (in case of non-affine model, ie. translational model with one motion vector)/control point motion vectors (in case of affine model) are derived. In case, of non-affine motion information, the one or more corresponding control point motion vectors corresponds to the motion vector of the spatial neighboring block. In case, of affine motion information, the one or more corresponding control point motion vectors corresponds to for instance to the control point motion vectors $\vec{v}_0$ and $\vec{v}_1$ of the spatial neighboring block. Advantageously, motion compensation is improved in the present embodiment because motion information associated to the at least one spatial neighboring block further comprises non-affine motion information. At 1030, the method 1000 determines, for the block being encoded, based on the one or more corresponding control point motion vectors of each predictor candidate, a motion field based on a motion model for the predictor candidate, wherein the motion field identifies motion vectors used for prediction of sub-blocks of the block being encoded. At 1040, the method 1000 selects a predictor candidate from the set of predictor candidates based on a rate distortion determination on predictions responsive to the motion field determined for each predictor candidate. Indeed, as later exposed in FIG. 15 for the Affine merge mode, at 1040, the method 1000 selects a predictor candidate according to one or more criteria and based on the corresponding motion field. For example, the method 1000 estimates a rate-distortion cost for encoding the block in affine merge mode using the motion field determined at 1030 and stores the rate-distortion cost in association with the selected predictor candidate. The method iterates the estimation for all the predictor candidates of the set of predictor candidates. The method 1000 selects a predictor candidate from the set of predictor candidates based on the evaluating, ie the rate distortion determination. For example, the predictor candidate that provides the lowest rate-distortion cost for the block being encoded is selected. Of course, in a variant not explicated here, the Affine merge coding mode for that selected predictor is put in a further RD competition for determining the coding mode of the block to encode. At 1050, the method 1000 encodes the block based on the predictor candidate selected at 1040. At 1060, the method 1000 encodes an index of the predictor candidate selected at 1040. This index is used by the decoder to retrieve the predictor candidate from the set of predictor candidates.

Figure 11:
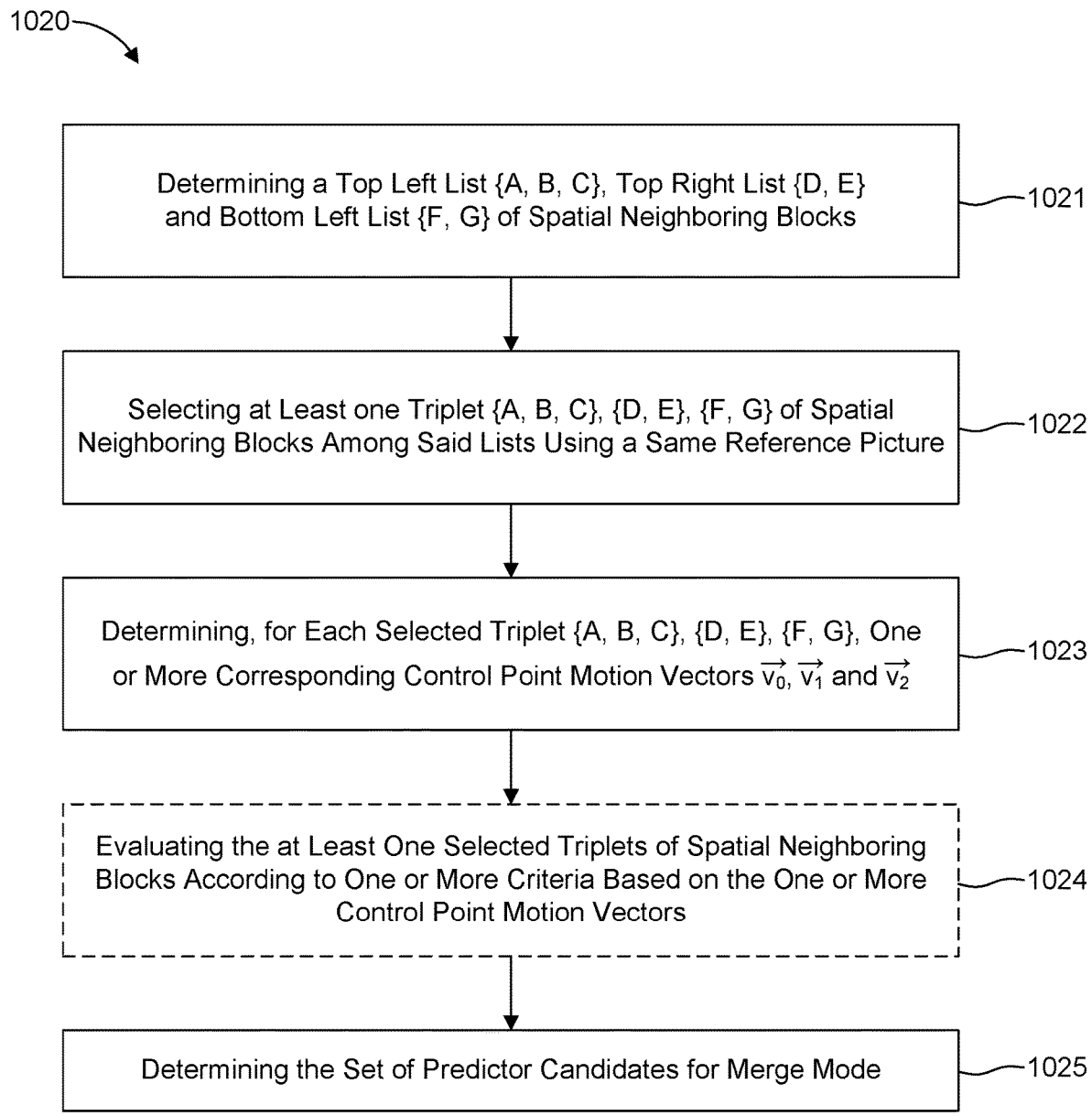
FIG. 11 illustrates another example of an encoding method according to a general aspect of at least one embodiment.
Figure 12:
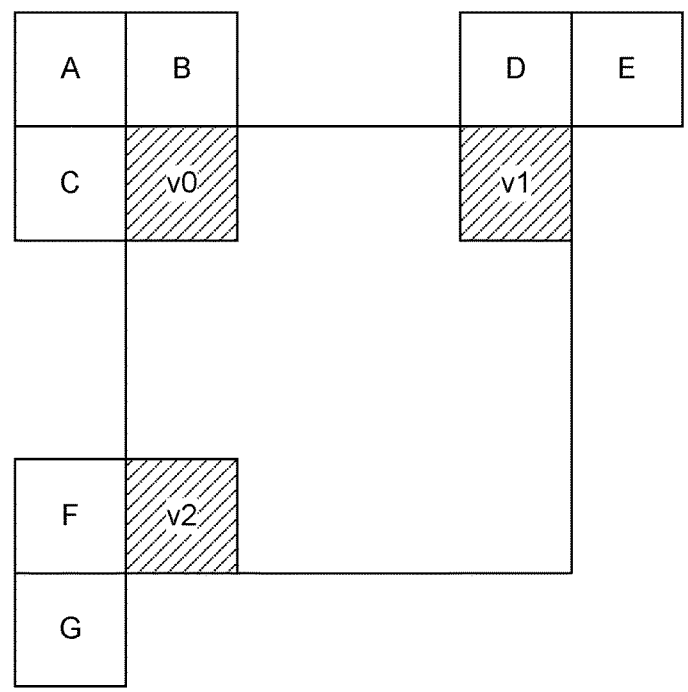
FIG. 12 illustrates an examples of motion vector prediction candidates for Affine Merge mode CUs according to a general aspect of at least one embodiment.

FIG. 11 illustrates an exemplary detail of determining of a set of predictor candidates for merge mode 1020 of the encoding method 1000 according to an aspect of at least one embodiment particularly adapted when the neighboring block comprises non-affine motion information. However, the method is compatible with the neighboring block comprising affine motion information. The skilled in the art, will appreciate that in case a neighboring block is coded with an affine model, the motion model of the affine coded neighboring block, can be used as detailed previously with reference for FIG. 9, for determining a predictor candidate for affine merge mode. At 1021, considering the at least one neighboring block of the block to encode, 3 lists are determined based on the spatial position of the block with respect to the block to encode. For instance, considering blocks A, B, C, D, E, F, G of FIG. 12, a first list, called top left list is created that comprises neighboring top-left corner blocks A, B, C; a second list, called top right list, is created that comprises neighboring top-right corner blocks D, E; and a third list is created that comprises neighboring bottom-left corner blocks F, G. According to a first aspect of the at least one embodiment, a triplet of spatial neighboring blocks is selected wherein each spatial neighboring block of the triplet respectively belongs to top left list, top right list, and bottom left list and wherein the reference picture being used for prediction of each spatial neighboring block of said triplet is the same. Therefore a triplet corresponds to a selection of {A,B,C}, {D,E}, {F,G}. At 1022, a first selection among the 12 possible triplets {A,B,C}, {D,E}, {F,G} is applied based on the usage of a same reference picture for each neighboring blocks of the triplet for motion compensation. Therefore, only a triplet A, D, F is selected where a same reference picture (identified by its index in a reference picture list) is used for prediction of neighboring block A, D and F. This first criterion assures coherence in the prediction. At 1023, the one or more control point motion vectors $\vec{v}_0$, $\vec{v}_1$ and $\vec{v}_2$ of the current CU are obtained based on motion information of the respective neighboring block. Thus the control point motion vector of the top-left corner of the block CU being encoded is determined based on motion information of the top left neighboring block of the triplet, i.e A, B or C. The control point motion vectors $\vec{v}_1$ of the top-right corner of the block CU being encoded is determined based on motion information of the top right neighboring block of the triplet, i.e D or E. The control point motion vectors $\vec{v}_2$ of the bottom-left corner of the block CU being encoded is determined based on motion information of the bottom left neighboring block of the triplet, i.e F or G. Up to 12 CPMVPs are obtained given the different combination of neighboring blocks, being predictor candidates for the block to encoded. For instance, in case the block A in the triplet is not affine coded, the control point motion vector $\vec{v}_0$ is derived based on the motion vector $\vec{v}$ of the block A (as known in HEVC) $\vec{v}_0=\vec{v}$. In case the block A is affine coded, the control point motion vector $\vec{v}_0$ is derived based on the control point motion vectors of the block A as described for instance with equation 2. The same principles are applied for determining control motion vectors $\vec{v}_1$ and $\vec{v}_2$ of the current CU based on corresponding neighboring top-right and bottom-left blocks. Thus, in the first aspect, 3 control point motion vectors are created for a predictor candidate among the 12 CPMVPs. The skilled in the art will appreciate that since prediction can be unidirectional or bidirectional, the determining of control point motion vectors for predictor candidate is repeated for each reference picture list L0 and L1. At 1025, these three CPMVs for each candidate (and for each reference picture list L0 and L1) are stored in the set of CPMVP candidates for merge mode. According to a variant, the number of CPMVPs candidates in the set of CPMVP candidates for merge mode is limited (for instance to 5 predictor candidates or 7 predictor candidates), the CPMVs for each candidate are thus stored as they are determined following a predetermined order of triplet while the set is not full. The remaining triplets are discarded.

At 1024, an optional second selection among the candidate CPMVPs is applied based on one or more criteria. According to a first criterion, candidate CPMVPs are further checked for validity using equation 3, for a block to encode of height H and Width W and where X and Y are respectively the horizontal and vertical components of a motion vector:

Equation 3

$$\overrightarrow{\Delta Hor} = \vec{v1} - \vec{v0}$$
$$\overrightarrow{\Delta Ver} = \vec{v2} - \vec{v0}$$
$$DiffH = \frac{W}{2}$$
$$DiffV = \frac{H}{2}$$
$$\text{validity} = \overrightarrow{\Delta Hor}! = \vec{0} \;\&\&\; \text{abs}(\overrightarrow{\Delta Hor}\cdot X) \le DiffH \;\&\&\; \text{abs}(\overrightarrow{\Delta Hor}\cdot Y) \le$$
$$DiffV \;\&\&\; \text{abs}(\overrightarrow{\Delta Ver}\cdot X) \le DiffH \;\&\&\; \text{abs}(\overrightarrow{\Delta Ver}\cdot Y) \le DiffV$$

Validity test for each CPMVP

Accordingly, to this variant, at 1025, these valid CPMVPs are stored in the set of CPMVP candidates for merge mode until the set of predictor candidates is not full. According to a second criterion, valid candidate CPMVPs are then sorted depending on the value of the bottom left motion vector $\vec{v}_2$, (taken from position F or G). The closest $\vec{v}_2$ is to the vector given by the affine motion model for the 4×4 sub-block at the same position as $\vec{v}_2$, the better is the CPMVP. This constraint is for instance implemented with the following equation 4:

$$\overrightarrow{\Delta Hor} = \vec{v1} - \vec{v0}$$

Equation 4:

$$\overrightarrow{\Delta Ver} = \vec{v2} - \vec{v0}$$

$$\text{cost} = \text{abs}(\overrightarrow{\Delta Hor}\cdot X^*H - \overrightarrow{\Delta Ver}\cdot Y^*W) + \text{abs}(\overrightarrow{\Delta Hor}\cdot Y^*H + \overrightarrow{\Delta Ver}\cdot X^*W)$$

Cost Computed for Each Candidate CPMVP

In case of bi-directional prediction, a cost is computed for each CPMVP and each reference picture list L0 and L1 using Equation 4. To compare unidirectional predictor candidates with bidirectional predictor candidates, for each predictor bidirectional candidate the cost of CPMVP is the mean of its list L0 related CPMVP cost and of its list L1 related CPMVP cost. According to this variant, at 1025, the ordered set of valid CPMVPs are stored in the set of CPMVP candidates for merge mode for each reference picture list L0 and L1.

According to second aspect of at least one embodiment of determining of a set of predictor candidates for merge mode 1020 of the encoding method 1000 as illustrated on FIG. 11, instead of using a triplet among neighboring blocks for determining 3 control motion point vectors for a predictor candidate, the determining uses pair among neighboring blocks for determining 2 control motion point vectors, namely either $\vec{v}_0$ and $\vec{v}_1$ or $\vec{v}_0$ and $\vec{v}_2$ for a predictor candidate. Again, up to 12 CPMVPs are obtained given the different combination of neighboring blocks, 3 for $\vec{v}_0$ multiply by 2 for $\vec{v}_1$ and 3 for $\vec{v}_0$ multiply by 2 for $\vec{v}_2$. As for the previous aspect, at 1022, a pair (for instance A, D) is selected in case a same reference picture (identified by its index in a reference picture list) is used for prediction of neighboring blocks A and D. At 1023, the 2 control point motion vectors $\vec{v_0}$ and $\vec{v_1}$ of the current CU are obtained based on motion information of the respective neighboring blocks A and D of the pair. Thus, the control point motion vector $\vec{v_0}$ of the top-left corner of the block CU being encoded is determined based on motion information of the top left neighboring block of the pair, i.e A in the example. The control point motion vectors $\vec{v_1}$ of the top-right corner of the block CU being encoded is determined based on motion information of the top right neighboring block of the triplet, i.e. D in the example. From Equation 1, we can derive the following equation 5 to compute $\vec{v2}$ from $\vec{v0}$ and $\vec{v1}$ $$\begin{cases} v_{2x} = -\frac{(v_{1y} - v_{0y})}{w}H + v_{0x} \\ v_{2y} = +\frac{(v_{1x} - v_{0x})}{w}H + v_{0y} \end{cases} \quad \text{Equation 5}$$

Derivation of Bottom-left motion vector $\vec{v2}$ from Top-Left and Top-Right motion vectors $\vec{v0}$ and $\vec{v1}$ Besides, considering pairs among top-left list {A, B, C} and bottom-left list {F, G}, the 2 control point motion vectors $\vec{v_0}$ and $\vec{v_2}$ of the current CU are obtained based on motion information of the respective neighboring blocks top-left corner and bottom-left corner neighboring blocks of the pair. Based on the obtained $\vec{v0}$ and $\vec{v2}$, we can derive the following equation 6 to compute $\vec{v1}$ from $\vec{v0}$ and $\vec{v2}$ $$\begin{cases} v_{1x} = +\frac{(v_{2y} - v_{0y})}{H}W + v_{0x} \\ v_{1y} = +\frac{(v_{2x} - v_{0x})}{H}W + v_{0y} \end{cases} \quad \text{Equation 6}$$

Derivation of Bottom-left motion vector $\vec{v1}$ from Top-Left and Top-Right motion vectors $\vec{v0}$ and $\vec{v2}$ As the standard Affine motion model, as described with equation 1 and illustrated on FIGS. 6 and 7, is based on top-left and top-right control point motion vectors $\vec{v0}$ and $\vec{v1}$, in the variant where the 2 control point motion vectors are top-left and bottom-left CPMVs $\vec{v0}$ and $\vec{v2}$, $\vec{v1}$ need to be computed to obtain the CPMV as shown in FIGS. 6 and 7. However, in the variant where the 2 control point motion vectors are top-left and top-right CPMVs $\vec{v0}$ and $\vec{v1}$ the computation of $\vec{v2}$ using Equation 5 can be discarded.

Besides, it should be noted that the second aspect based on pairs of neighboring blocks for determining 2 CPMVs is not compatible with the evaluating 1024 of the predictor candidates based on their respective CPMVs as the third CPMV (according to Equation 5 or Equation 6) is not determined independently of the first 2 CPMVs. Thus, the validity check of Equation 3 and the cost function of Equation 4 are skipped and the CPMVP determined at 1023 are added to the set of predictor candidates for affine merge mode without any sorting.

Besides, according to a variant of that the second aspect based on pairs of neighboring blocks for determining 2 CPMVs, the use of bi-directional affine merge candidate is favored over uni-directional affine merge candidate, by adding the bi-directional candidates first in the set of predictor candidates. This ensures having the maximum of bidirectional candidates added in the set of predictor candidates for affine merge mode.

In a variation of first and second aspect of the at least one embodiment of determining of a set of predictor candidates for merge mode 1020, only affine neighbor blocks are used to create new affine motion candidates. In other word, determining top-left CPMV, top-right CPMV and bottom-left CPMV is based on motion information of the respective top-left neighboring blocks, top-right neighboring blocks and bottom-left neighboring blocks. In this case, motion information associated to the at least one spatial neighboring block comprises only affine motion information. This variation differs from the JEM affine merge mode in that the motion model of the selected affine neighbor block is expanded to the block to encode.

Figure 14:
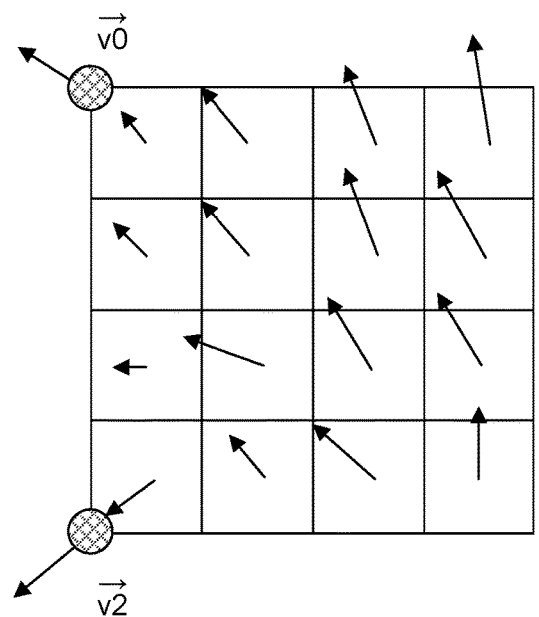
FIG. 14 illustrates another example of an affine model as the motion model and its corresponding 4×4 sub-CU based affine motion vector field according to a general aspect of at least one embodiment.

In another variation of first and second aspect of the at least one embodiment of determining of a set of predictor candidates for merge mode 1020, at 1030 a new affine motion model based on top-left CPMV $\vec{v0}$ and bottom-left CPMV $\vec{v2}$ is defined for determining the motion field instead of the standard Affine motion model based on top-left CPMV $\vec{v0}$ and top-right CPMV $\vec{v1}$. FIGS. 6 and 7 illustrate the so-called the standard Affine motion as described with equation 1. FIG. 14 illustrates the new affine motion model as described with equation 7 wherein motion vectors for each 4×4 sub-block may be computed from CPMV $\vec{v0}$ and $\vec{v2}$:

$$\begin{cases} v_x = \frac{(v_{2y} - v_{0y})}{h}x - \frac{(v_{2x} - v_{0x})}{h}y + v_{0x} \\ v_y = \frac{(v_{2x} - v_{0x})}{h}x + \frac{(v_{2y} - v_{0y})}{h}y + v_{0y} \end{cases} \quad \text{Equation 7}$$

affine model used to generate motion field inside a CU from $(\vec{v0}, \vec{v2})$ This variation is particularly well adapted to the embodiment based on pair of top-left and bottom-left neighboring blocks, wherein top-left and bottom-left CMPV $\vec{v0}$ and $\vec{v2}$ are determined for the predictor candidate. Advantageously, there is no need to compute the top-right CMPV $\vec{v1}$ but the affine motion model directly uses $\vec{v2}$ as a CPMV.

Besides, this variation provides additional CPMVPs for the set of predictor candidates in affine merge mode, CPMVPs comprising CPMV $(\vec{v0}, \vec{v1})$ and CPMVPs comprising CPMV $(\vec{v0}, \vec{v2})$ are added to the set of predictor candidates. At 1040, the rate-distortion competition occurs between predictor candidates based on $(\vec{v0}, \vec{v1})$ CPMV and predictor candidates based $(\vec{v0}, \vec{v2})$ CPMV. Unlike in some aspect of the described embodiment where the derivation of CPMVP candidate for Affine merge mode uses vector $\vec{v2}$ only for computing the cost for the CPMVP, in some case a better prediction may be obtained by using $(\vec{v0}, \vec{v2})$ as CPMV. Accordingly, such motion model need to define which CPMVs are used. In this case a flag is added in the bitstream to indicate if we use $(\vec{v0}, \vec{v1})$ or $(\vec{v0}, \vec{v2})$ as Control Point Motion Vector.

TABLE 1

Modified syntax to indicate which CPMVs are used

| prediction_unit( x0, y0, nPbW, nPbH ) { | Descriptor |
|---|---|
|   if( cu_skip_flag[ x0 ][ y0 ] ) { | |
|     if( MaxNumMergeCand > 1 ) | |
|       merge_idx[ x0 ][ y0 ] | ae(v) |
|   } else { /* MODE_INTER */ | |
|     merge_flag[ x0 ][ y0 ] | ae(v) |
|     if( merge_flag[ x0 ][ y0 ]) { | |
|       if( MaxNumMergeCand > 1) | |
|         merge_idx[ x0 ][ y0 ] | ae(v) |
|     } else { | |
|       affine_flag[ x0 ][ y0 ] | ae(v) |
|       if( slice_type = = B ) | |
|         inter_pred_idc[ x0 ][ y0 ] | ae(v) |
|       if( inter_pred_idc[ x0 ][ y0 ] != PRED_L1) { | |
|         if( num_ref_idx_l0_active_minus1 > 0) | |
|           ref_idx_l0[ x0 ][ y0 ] | ae(v) |
|         mvd_coding(x0, y0, 0 ) | |
|         mvp_l0_flag[ x0 ][ y0 ] | ae(v) |
|         if( affine_flag[ x0 ][ y0 ] { | |
|           control_point_horizontal_l0_flag[ x0 ][ y0 ] | ae(v) |
|         } | |
|       } | |
|       if( inter_pred_idc[ x0 ][ y0 ] != PRED_L0 ) { | |
|         if( num_ref_idx_l1_active_minus1 > 0) | |
|           ref_idx_l1[ x0 ][ y0 ] | ae(v) |
|         if( mvd_l1_zero_flag && | |
|           inter_pred_idc[ x0 ][ y0 ] = = PRED_BI) { | |
|           MvdL1[ x0 ][ y0 ][ 0 ] = 0 | |
|           MvdL1[ x0 ][ y0 ][ 1 ] = 0 | |
|         } else | |
|           mvd_coding( x0, y0, 1 ) | |
|         mvp_l1_flag[ x0 ][ y0 ] | ae(v) |
|         if( affine_flag[ x0 ][ y0 ] > 0 { | |
|           control_point_horizontal_l1_flag[ x0 ][ y0 ] | ae(v) |
|         } | |
|       } | |
|     } | |
|   } | |
| } | | control_point_horizontal_l0_flag[x0][y0] specifies the control point used for list L0 for the block being encoded, ie the current prediction block. The array indices x0, y0 specify the location (x0, y0) of the top-left luma sample of the considered prediction block relative to the top-left luma sample of the picture. If the flag is equal to 1, $(\vec{v0}, \vec{v1})$ are used as CPMV, else $(\vec{v0}, \vec{v2})$ are used.

In another variation of first and second aspect of the at least one embodiment of determining of a set of predictor candidates for merge mode 1020, at 1030 the new affine motion model based on top-left CPMV $\vec{v0}$ and bottom-left CPMV $\vec{v2}$ or the standard affine motion model based on top-left CPMV $\vec{v0}$ and top-right CPMV $\vec{v1}$ is implicitly derived from surrounding available information. For example, to have more precision for CPMV, we may use ($\vec{v0}, \vec{v1}$) if the width of the block is greater than the height and use ($\vec{v0}, \vec{v2}$) if the height of the block is greater than width.

Figure 13:
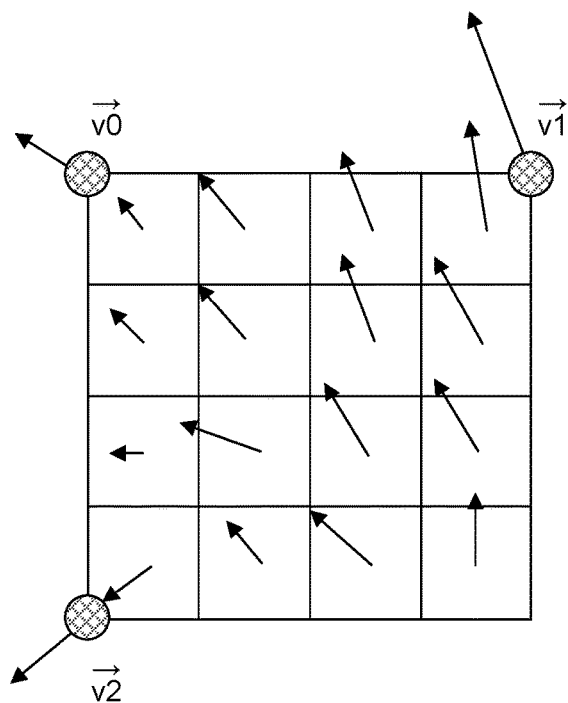
FIG. 13 illustrates an example of an affine model as the motion model and its corresponding 4×4 sub-CU based affine motion vector field according to a general aspect of at least one embodiment.
Figure 15:
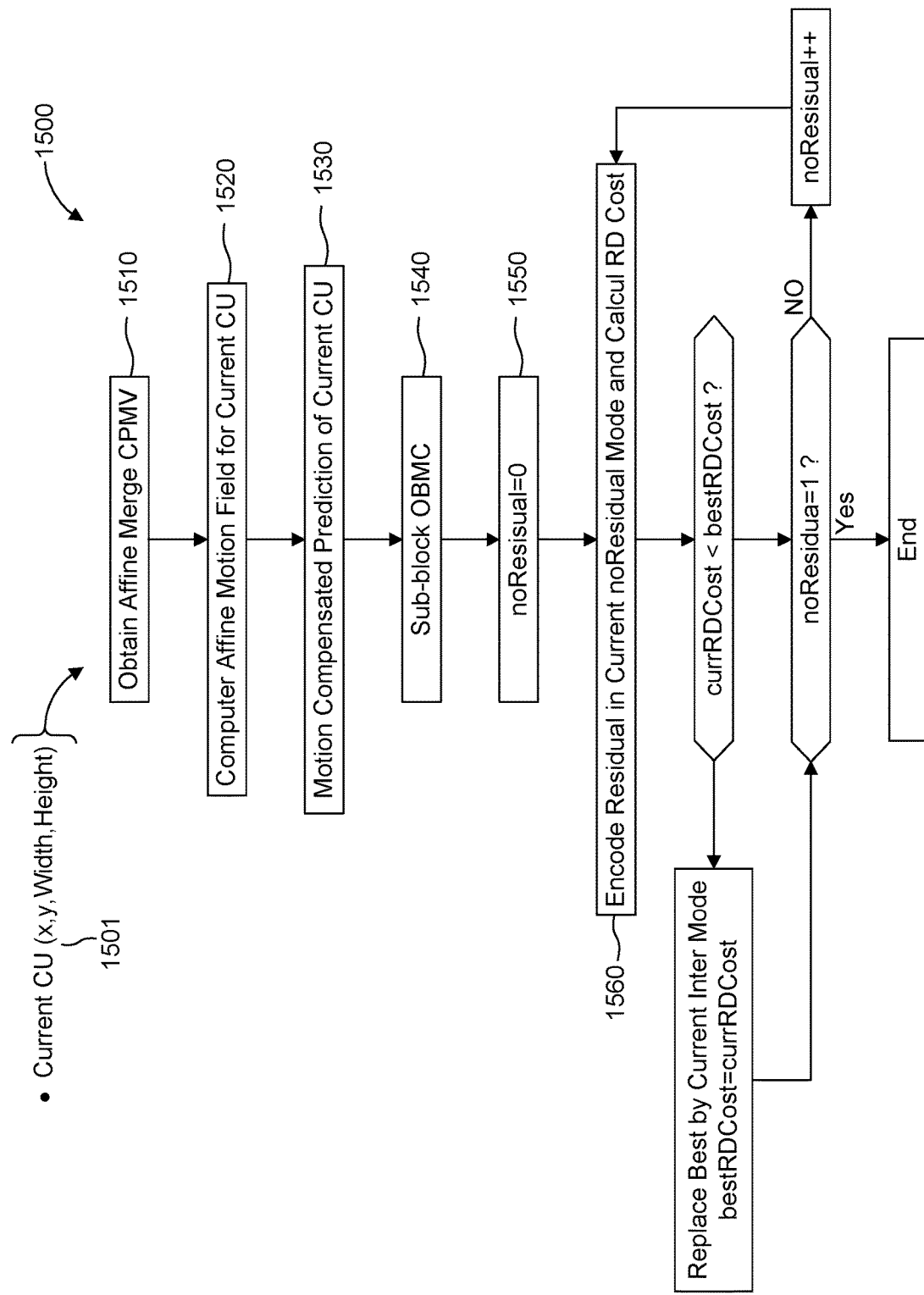
FIG. 15 illustrate an example of a known process/syntax for evaluating the Affine Merge mode of a CU in JEM.

FIG. 15 illustrates the detail of an embodiment of a process/syntax 1500 used to predict the affine motion field of a current CU being encoded or decoded in the existing Affine Merge mode in JEM. The input 1501 to this process/syntax 1500 is the current Coding Unit for which one wants to generate the affine motion field of the sub-blocks as shown in FIG. 7. A process/syntax of the process/syntax 1500 adapted to each aspect (such as bidirectional predictors, $\vec{v_0}$ and $\vec{v_2}$ CPMVs) of the at least one embodiment previously described may be used for each predictor candidate of the set of predictor candidates for affine merge mode to select predictor candidate based on RD cost. Accordingly, at 1510, the Affine Merge CPMVs for the current block are obtained for the predictor candidate as explained above in connection with, e.g., FIG. 13 and FIG. 14. At 1520, the top-left and top-right control point motion vectors $\vec{v_0}$ and $\vec{v_1}$ are then used to compute the affine motion field associated with the current CU. This consists in computing a motion vector for each 4×4 sub-block according to Equation 1 as explained before. At 1530 and 1540, once the motion field is obtained for the current CU, the temporal prediction of the current CU takes place, involving 4×4 sub-block based motion compensation and then OBMC (Overlapped Block Motion Compensation). At 1550 and 1560, the current CU is coded and reconstructed, successively with and without residual data. For example, at 1550, the current CU is first coded using intra mode with no residual coding. At 1560, the best way to encode the current CU (e.g., the way having minimum rate distortion cost), is then selected, which provides the coding of the current CU in the Affine Merge mode. The Affine Merge coding mode is then put in a rate distortion (RD) competition with other coding modes (including e.g., AMVP mode with residual coding) available for the current CU in the considered video coding system. A mode is selected based on the RD competition, and that mode is used to encode the current CU, and an index for that mode is also encoded in various embodiments.

In at least one implementation, a residual flag is used. At 1550, a flag is activated indicating that the coding is done with residual data. At 1560, the current CU is fully coded and reconstructed (with residual) giving the corresponding RD cost. Then the flag is deactivated indicating that the coding is done without residual data, and the process goes back to 1560 where the CU is coded (without residual) giving the corresponding RD cost. The lowest RD cost between the two previous ones indicates if residual must be coded or not (normal or skip). Then this best RD cost is put in competition with other coding modes. Rate distortion determination will be explained in more detail below.

Figure 16:
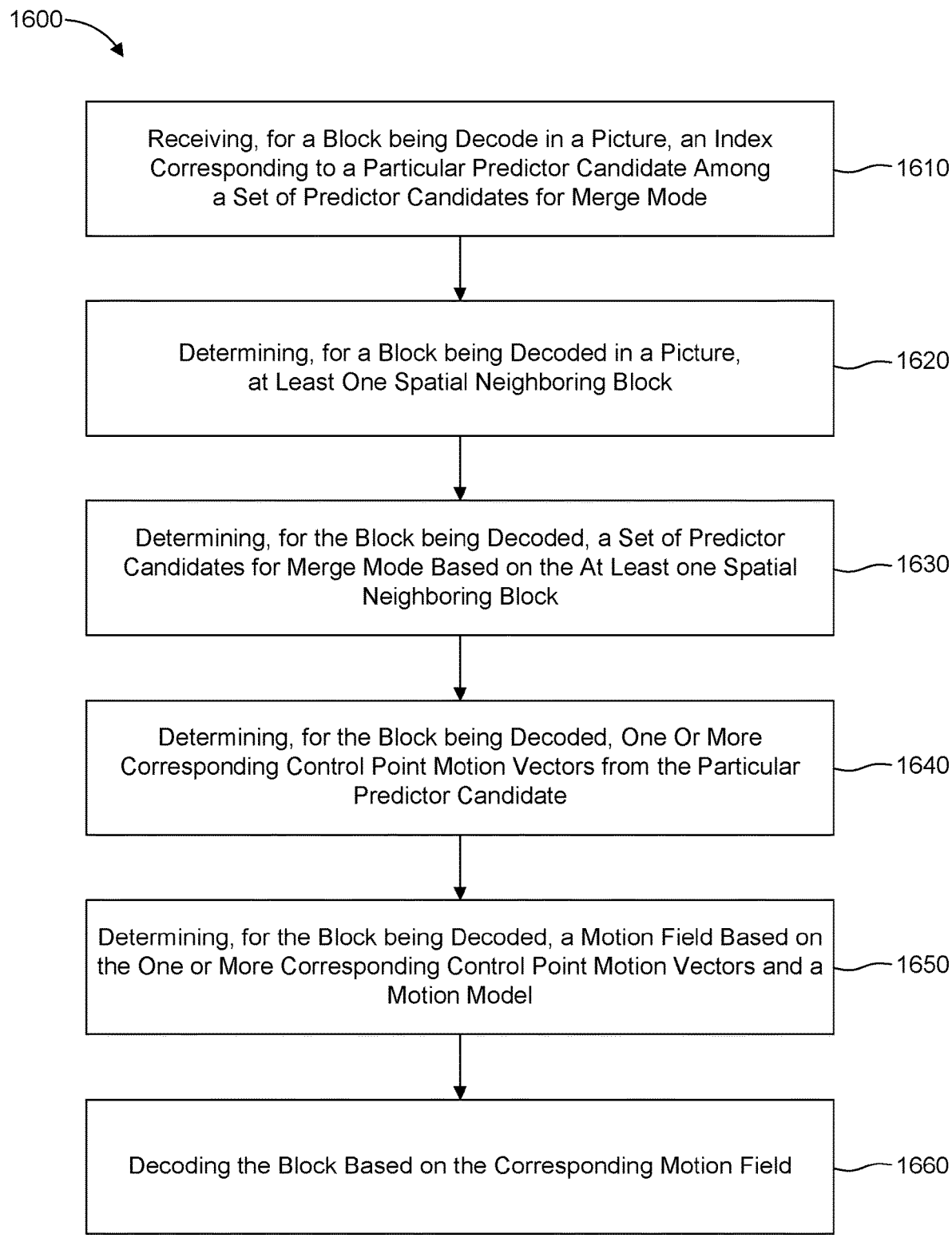
FIG. 16 illustrates an example decoding method according to a general aspect of at least one embodiment.

FIG. 16 illustrates an exemplary decoding method 1600 according to a general aspect of at least one embodiment. At 1610, the method 1600 receives, for a block being decoded in a picture, an index corresponding to a particular predictor candidate among a set of predictor candidates. In various embodiments, the particular predictor candidate has been selected at an encoder among a set of predictor candidates, and the index allows one of predictor candidates to be selected. At 1620, the method 1600 determines, for the block being decoded, at least one spatial neighboring block. At 1630, the method 1600 determines, for the block being decoded, a set of predictor candidates based on the at least one spatial neighboring block. A predictor candidate comprises one or more corresponding control point motion vectors for the block being decoded and one reference picture. Any of the variants described for the determining of a set of predictor candidates with regards to the encoding method 1000 are mirrored at the decoder side as shown for instance on FIG. 17. At 1640, the method 1600 determines one or more control point motion vectors from the particular predictor candidate. At 1650, the method 1600 determines for the particular predictor candidate, based on the one or more corresponding control point motion vectors, a corresponding motion field. In various embodiments, the motion field is based on a motion model, wherein the corresponding motion field identifies motion vectors used for prediction of sub-blocks of the block being decoded. The motion field may be based on an affine motion model that derives motion vectors used for prediction of sub-blocks of the block being decoded based on either on the top-left and top-right control point motion vectors $\vec{v}_0$ and $\vec{v}_1$ or the top-left and bottom-left control point motion vectors $\vec{v}_0$ and $\vec{v}_2$. Advantageously, in this embodiment, at 1610, the method 1600 further receives, for a block being decoded, an indication corresponding to a motion model used for the block being decoded. In another variant for this embodiment, the indication corresponding to the motion model used for the block being decoded is implicitly derived from spatial information of the block being decoded. At 1660, the method 1600 decodes the block based on the corresponding motion field.

Figure 17:
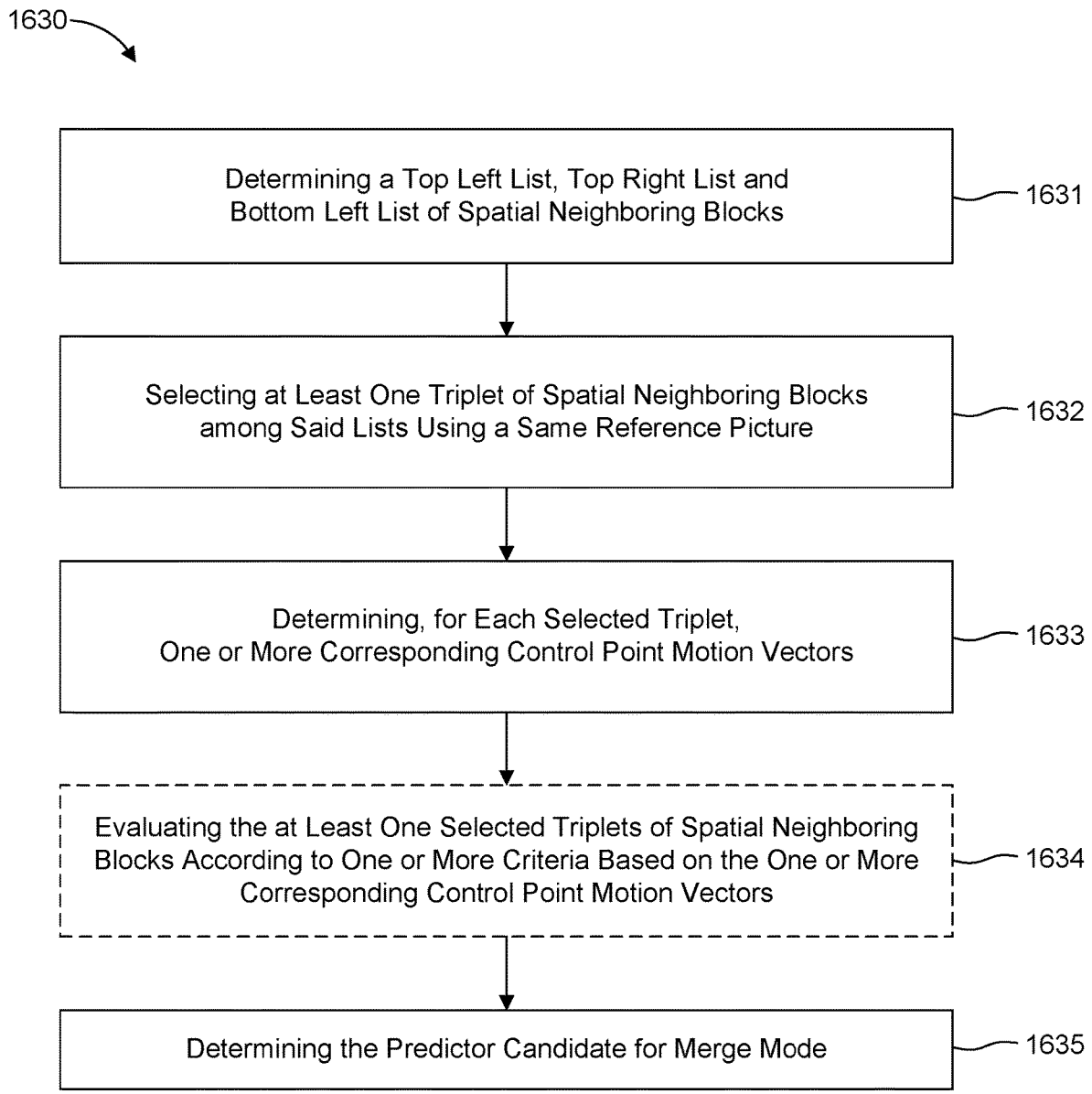
FIG. 17 illustrates another example of an encoding method according to a general aspect of at least one embodiment.

FIG. 17 illustrates an exemplary detail of determining of a set of predictor candidates for merge mode 1020 of the decoding method 1600 according to an aspect of at least one embodiment. Various embodiments described with respect to f FIG. 11 for the detail of the encoding method, are herein repeated.

The present inventors have recognized that one aspect of the existing Affine Merge process described above is that it systematically employs one and only one motion vector predictor to propagate an affine motion field from a surrounding past and neighboring CU towards a current CU. In various situations, the present inventors have further recognized that this aspect can be disadvantageous because, for example, it does not select the optimal motion vector predictor. Moreover, the choice of this predictor consists only of the first past and neighboring CU coded in Affine mode, in the ordered set (A, B, C, D, E), as already noted before. In various situations, the present inventors have further recognized that this limited choice can be disadvantageous because, for example, a better predictor might be available. Therefore, the existing process in the current JEM does not consider the fact that several potential past and neighboring CUs around the current CU may also have used affine motion, and that a different CU other than the first one found to have used affine motion may be a better predictor for the current CU's motion information.

Therefore, the present inventors have recognized the potential advantages in several ways to improve the prediction of the current CU affine motion vectors that are not being exploited by the existing JEM codecs.

Figure 18:
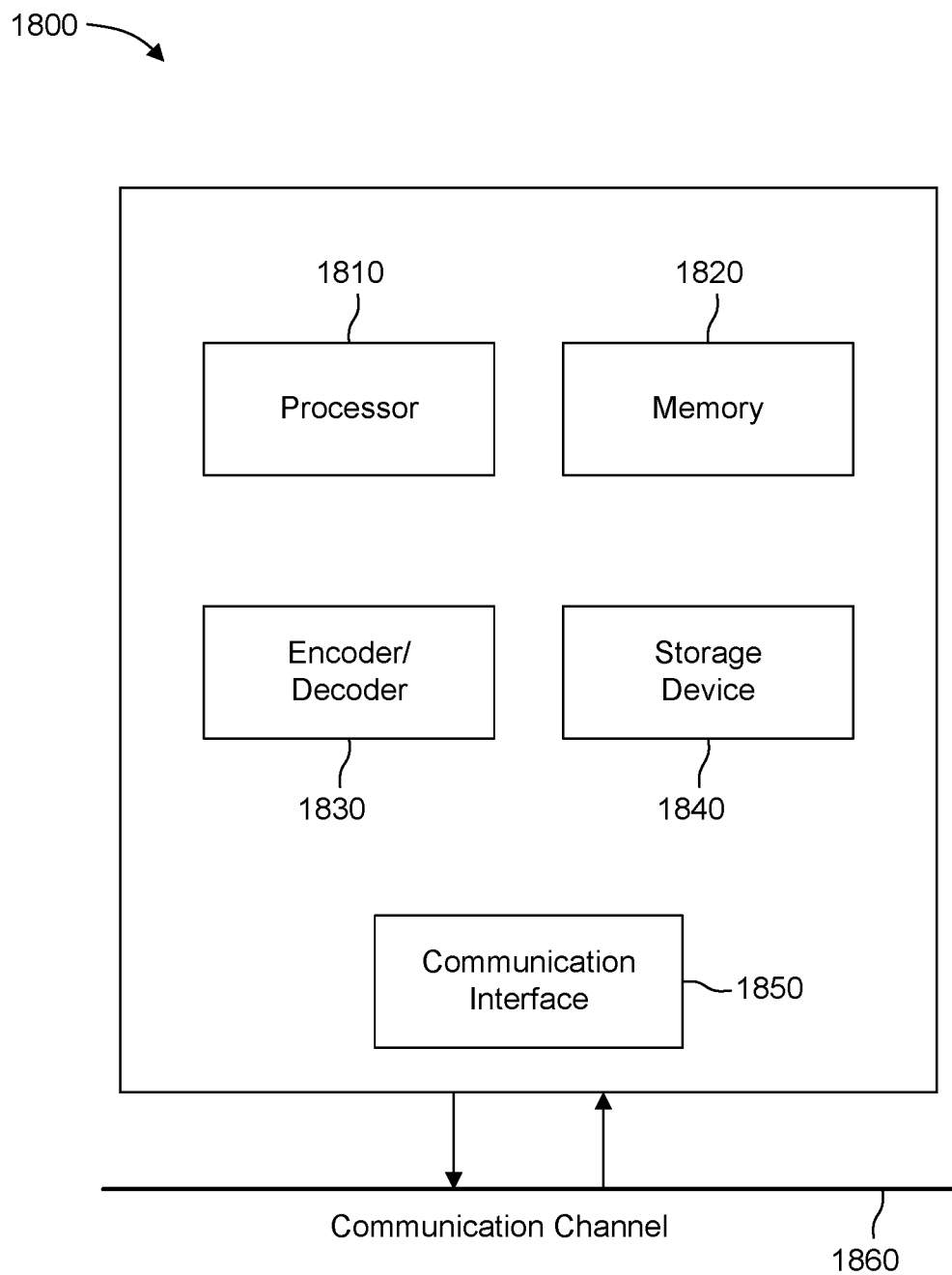
FIG. 18 illustrates a block diagram of an example apparatus in which various aspects of the embodiments may be implemented.

FIG. 18 illustrates a block diagram of an exemplary system 1800 in which various aspects of the exemplary embodiments may be implemented. The system 1800 may be embodied as a device including the various components described below and is configured to perform the processes described above. Examples of such devices, include, but are not limited to, personal computers, laptop computers, smartphones, tablet computers, digital multimedia set top boxes, digital television receivers, personal video recording systems, connected home appliances, and servers. The system 1800 may be communicatively coupled to other similar systems, and to a display via a communication channel as shown in FIG. 18 and as known by those skilled in the art to implement all or part of the exemplary video systems described above.

Various embodiments of the system 1800 include at least one processor 1810 configured to execute instructions loaded therein for implementing the various processes as discussed above. The processor 1810 may include embedded memory, input output interface, and various other circuitries as known in the art. The system 1800 may also include at least one memory 1820 (e.g., a volatile memory device, a non-volatile memory device). The system 1800 may additionally include a storage device 1840, which may include non-volatile memory, including, but not limited to, EEPROM, ROM, PROM, RAM, DRAM, SRAM, flash, magnetic disk drive, and/or optical disk drive. The storage device 1840 may comprise an internal storage device, an attached storage device, and/or a network accessible storage device, as non-limiting examples. The system 1800 may also include an encoder/decoder module 1830 configured to process data to provide encoded video and/or decoded video, and the encoder/decoder module 1830 may include its own processor and memory.

The encoder/decoder module 1830 represents the module(s) that may be included in a device to perform the encoding and/or decoding functions. As is known, such a device may include one or both of the encoding and decoding modules. Additionally, the encoder/decoder module 1830 may be implemented as a separate element of the system 1800 or may be incorporated within one or more processors 1810 as a combination of hardware and software as known to those skilled in the art.

Program code to be loaded onto one or more processors 1810 to perform the various processes described hereinabove may be stored in the storage device 1840 and subsequently loaded onto the memory 1820 for execution by the processors 1810. In accordance with the exemplary embodiments, one or more of the processor(s) 1810, the memory 1820, the storage device 1840, and the encoder/decoder module 1830 may store one or more of the various items during the performance of the processes discussed herein above, including, but not limited to the input video, the decoded video, the bitstream, equations, formulas, matrices, variables, operations, and operational logic.

The system 1800 may also include a communication interface 1850 that enables communication with other devices via a communication channel 1860. The communication interface 1850 may include, but is not limited to a transceiver configured to transmit and receive data from the communication channel 1860. The communication interface 1850 may include, but is not limited to, a modem or network card and the communication channel 1850 may be implemented within a wired and/or wireless medium. The various components of the system 1800 may be connected or communicatively coupled together (not shown in FIG. 18) using various suitable connections, including, but not limited to internal buses, wires, and printed circuit boards.

The exemplary embodiments may be carried out by computer software implemented by the processor 1810 or by hardware, or by a combination of hardware and software. As a non-limiting example, the exemplary embodiments may be implemented by one or more integrated circuits. The memory 1820 may be of any type appropriate to the technical environment and may be implemented using any appropriate data storage technology, such as optical memory devices, magnetic memory devices, semiconductor-based memory devices, fixed memory, and removable memory, as non-limiting examples. The processor 1810 may be of any type appropriate to the technical environment, and may encompass one or more of microprocessors, general purpose computers, special purpose computers, and processors based on a multi-core architecture, as non-limiting examples.

The implementations described herein may be implemented in, for example, a method or a process, an apparatus, a software program, a data stream, or a signal. Even if only discussed in the context of a single form of implementation (for example, discussed only as a method), the implementation of features discussed may also be implemented in other forms (for example, an apparatus or a program). An apparatus may be implemented in, for example, appropriate hardware, software, and firmware. The methods may be implemented in, for example, an apparatus such as, for example, a processor, which refers to processing devices in general, including, for example, a computer, a microprocessor, an integrated circuit, or a programmable logic device. Processors also include communication devices, such as, for example, computers, cell phones, portable/personal digital assistants ("PDAs"), and other devices that facilitate communication of information between end-users.

Furthermore, one skilled in the art may readily appreciate that the exemplary HEVC encoder 100 shown in FIG. 1 and the exemplary HEVC decoder shown in FIG. 3 may be modified according to the above teachings of the present disclosure in order to implement the disclosed improvements to the exiting HEVC standards for achieving better compression/decompression. For example, motion compensation 170, and motion estimation 175 in the exemplary encoder 100 of FIG. 1, and motion compensation 375, in the exemplary decoder of FIG. 3 may be modified according to the disclosed teachings to implement one or more exemplary aspects of the present disclosure including providing an enhanced affine merge prediction to the existing JEM.

Reference to "one embodiment" or "an embodiment" or "one implementation" or "an implementation", as well as other variations thereof, mean that a particular feature, structure, characteristic, and so forth described in connection with the embodiment is included in at least one embodiment. Thus, the appearances of the phrase "in one embodiment" or "in an embodiment" or "in one implementation" or "in an implementation", as well any other variations, appearing in various places throughout the specification are not necessarily all referring to the same embodiment.

Additionally, this application or its claims may refer to "determining" various pieces of information. Determining the information may include one or more of, for example, estimating the information, calculating the information, predicting the information, or retrieving the information from memory.

Further, this application or its claims may refer to "accessing" various pieces of information. Accessing the information may include one or more of, for example, receiving the information, retrieving the information (for example, from memory), storing the information, processing the information, transmitting the information, moving the information, copying the information, erasing the information, calculating the information, determining the information, predicting the information, or estimating the information.

Additionally, this application or its claims may refer to "receiving" various pieces of information. Receiving is, as with "accessing", intended to be a broad term. Receiving the information may include one or more of, for example, accessing the information, or retrieving the information (for example, from memory). Further, "receiving" is typically involved, in one way or another, during operations such as, for example, storing the information, processing the information, transmitting the information, moving the information, copying the information, erasing the information, calculating the information, determining the information, predicting the information, or estimating the information.

As will be evident to one of skill in the art, implementations may produce a variety of signals formatted to carry information that may be, for example, stored or transmitted. The information may include, for example, instructions for performing a method, or data produced by one of the described implementations. For example, a signal may be formatted to carry the bitstream of a described embodiment. Such a signal may be formatted, for example, as an electromagnetic wave (for example, using a radio frequency portion of spectrum) or as a baseband signal. The formatting may include, for example, encoding a data stream and modulating a carrier with the encoded data stream. The information that the signal carries may be, for example, analog or digital information. The signal may be transmitted over a variety of different wired or wireless links, as is known. The signal may be stored on a processor-readable medium.

The invention claimed is:

1. A method for video encoding, comprising:
   determining, for a block being encoded in a picture, a top-left list of spatial neighboring blocks of the block being encoded comprising neighboring blocks of the top-left corner, a top-right list of spatial neighboring blocks of the block being encoded comprising neighboring blocks of the top-right corner, wherein the block is encoded in an affine merge mode;
   determining, for the block being encoded, a constructed affine merging predictor candidate, the constructed affine merging predictor candidate comprising a first control point motion vector of an affine motion model, a second control point motion vector of an affine motion model, and a reference picture, wherein, on a condition that a reference picture of a first spatial neighboring block of the top-left list of spatial neighboring blocks is the same as a reference picture of a second spatial neighboring block of the top-right list of spatial neighboring blocks, a motion vector of the first spatial neighboring block of the top-left list of spatial neighboring blocks is used as the first control point motion vector, a motion vector of the second spatial neighboring block of the top-right list of spatial neighboring blocks is used as the second control point motion vector, and the reference picture of the first spatial neighboring block of the top-left list of spatial neighboring blocks is used as the reference picture of the constructed affine merging predictor candidate;
   determining a prediction of the block being encoded based on an affine motion model of the constructed affine merging predictor candidate; and
   encoding the block based on the determined prediction.

2. A method for video decoding, comprising:
   determining, for a block being decoded, a top-left list of spatial neighboring blocks of the block being decoded comprising neighboring blocks of the top-left corner, a top-right list of spatial neighboring blocks of the block being decoded comprising neighboring blocks of the top-right corner, wherein the block is decoded in an affine merge mode;
   determining, for the block being decoded, a constructed affine merging predictor candidate, the constructed affine merging predictor candidate comprising a first control point motion vector of an affine motion model, a second control point motion vector of an affine motion model, and a reference picture, wherein, on a condition that a reference picture of a first spatial neighboring block of the top-left list of spatial neighboring blocks is the same as a reference picture of a second spatial neighboring block of the top-right list of spatial neighboring blocks, a motion vector of the first spatial neighboring block of the top-left list of spatial neighboring blocks is used as the first control point motion vector, a motion vector of the second spatial neighboring block of the top-right list of spatial neighboring blocks is used as the second control point motion vector, and the reference picture of the first spatial neighboring block of the top-left list of spatial neighboring blocks is used as the reference picture of the constructed affine merging predictor candidate;

determining a prediction of the block being decoded based on the affine motion model of the constructed affine merging predictor candidate; and decoding the block based on the determined prediction.

3. The method of claim 2, wherein the motion vector of the first spatial neighboring block used as the first control point motion vector comprises translational motion information, or wherein the motion vector of the second spatial neighboring block used as the second control point motion vector comprises translational motion information.

4. The method of claim 2, wherein the motion vector of the first spatial neighboring block used as the first control point motion vector comprises affine motion information, or wherein the motion vector of the second spatial neighboring block used as the second control point motion vector comprises affine motion information.

5. The method of claim 2, wherein a motion field for each position (x, y) inside the block being decoded is determined by:

$$\begin{cases} v_x = \frac{(v_{1x} - v_{0x})}{w}x - \frac{(v_{1y} - v_{0y})}{w}y + v_{0x} \\ v_y = \frac{(v_{1y} - v_{0y})}{w}x + \frac{(v_{2y1x} - v_{0x})}{w}y + v_{0y} \end{cases}$$

wherein:
  ($v_{0x}$,$v_{0y}$) corresponds to the first control point motion vector;
  ($v_{1x}$,$v_{1y}$) corresponds to the second control point motion vector; and
  w is a width height of the block being decoded.

6. The method of claim 2, wherein an index indicating to use the constructed affine merging predictor candidate is decoded to determine the prediction of the block being decoded.

7. A non-transitory computer readable storage medium having stored thereon instructions for decoding video data according to claim 2.

8. An apparatus for video encoding comprising at least a memory and one or more processors configured to:
  determine, for a block being encoded in a picture, a top-left list of spatial neighboring blocks of the block being encoded comprising neighboring blocks of the top-left corner, a top-right list of spatial neighboring blocks of the block being encoded comprising neighboring blocks of the top-right corner, wherein the block is encoded in an affine merge mode;
  determine, for the block being encoded, a constructed affine merging predictor candidate, the constructed affine merging predictor candidate comprising a first control point motion vector of an affine motion model, a second control point motion vector of an affine motion model, and a reference picture, wherein, on a condition that a reference picture of a first spatial neighboring block of the top-left list of spatial neighboring blocks is the same as a reference picture of a second spatial neighboring block of the top-right list of spatial neighboring blocks, a motion vector of the first spatial neighboring block of the top-left list of spatial neighboring blocks is used as the first control point motion vector, a motion vector of the second spatial neighboring block of the top-right list of spatial neighboring blocks is used as the second control point motion vector, and the reference picture of the first spatial neighboring block of the top-left list of spatial neighboring blocks is used as the reference picture of the constructed affine merging predictor candidate;
  determine a prediction of the block being encoded based on an affine motion model of the constructed affine merging predictor candidate; and
  encode the block based on the determined prediction.

9. An apparatus for video decoding comprising at least a memory and one or more processors configured:
  determine, for a block being decoded, a top-left list of spatial neighboring blocks of the block being decoded comprising neighboring blocks of the top-left corner, a top-right list of spatial neighboring blocks of the block being decoded comprising neighboring blocks of the top-right corner, wherein the block is decoded in an affine merge mode;
  determine, for the block being decoded, a constructed affine merging predictor candidate, the constructed affine merging predictor candidate comprising a first control point motion vector of an affine motion model, a second control point motion vector of an affine motion model, and a reference picture, wherein, on a condition that a reference picture of a first spatial neighboring block of the top-left list of spatial neighboring blocks is the same as a reference picture of a second spatial neighboring block of the top-right list of spatial neighboring blocks, a motion vector of the first spatial neighboring block of the top-left list of spatial neighboring blocks is used as the first control point motion vector, a motion vector of the second spatial neighboring block of the top-right list of spatial neighboring blocks is used as the second control point motion vector, and the reference picture of the first spatial neighboring block of the top-left list of spatial neighboring blocks is used as the reference picture of the constructed affine merging predictor candidate;
  determine a prediction of the block being decoded based on the affine motion model of the constructed affine merging predictor candidate; and
  decode the block based on the determined prediction.

10. The method of claim 1, wherein a motion field for each position (x, y) inside the block being encoded is determined by:

$$\begin{cases} v_x = \frac{(v_{1x} - v_{0x})}{w}x - \frac{(v_{1y} - v_{0y})}{w}y + v_{0x} \\ v_y = \frac{(v_{1y} - v_{0y})}{w}x + \frac{(v_{2y1x} - v_{0x})}{w}y + v_{0y} \end{cases}$$

wherein:
  ($v_{0x}$,$v_{0y}$) corresponds to the first control point motion vector;
  ($v_{1x}$,$v_{1y}$) corresponds to the second control point motion vector; and
  w is a width of the block being encoded.

11. The method of claim 1, wherein the motion vector of the first spatial neighboring block used as the first control point motion vector comprises translational motion information, or wherein the motion vector of the second spatial neighboring block used as the second control point motion vector comprises translational motion information.

12. The method of claim 1, wherein the motion vector of the first spatial neighboring block used as the first control point motion vector comprises affine motion information, or wherein the motion vector of the second spatial neighboring block used as the second control point motion vector comprises affine motion information.

13. The method of claim 1, wherein an index indicating to use the constructed affine merging predictor candidate is encoded.

14. A non-transitory computer readable storage medium having stored thereon instructions for encoding video data according to claim 1.

15. The apparatus of claim 8, wherein the motion vector of the first spatial neighboring block used as the first control point motion vector comprises translational motion information, or wherein the motion vector of the second spatial neighboring block used as the second control point motion vector comprises translational motion information.

16. The apparatus of claim 8, wherein the motion vector of the first spatial neighboring block used as the first control point motion vector comprises affine motion information, or wherein the motion vector of the second spatial neighboring block used as the second control point motion vector comprises affine motion information.

17. The apparatus of claim 8, wherein a motion field for each position (x, y) inside the block being encoded is determined by:

$$\begin{cases} v_x = \frac{(v_{1x} - v_{0x})}{w}x - \frac{(v_{1y} - v_{0y})}{w}y + v_{0x} \\ v_y = \frac{(v_{1y} - v_{0y})}{w}x + \frac{(v_{2y1x} - v_{0x})}{w}y + v_{0y} \end{cases}$$

wherein: $(v_{0x}, v_{0y})$ corresponds to the first control point motion vector;

$(v_{1x}, v_{1y})$ corresponds to the second control point motion vector; and w is a width of the block being decoded.

18. The apparatus of claim 8, wherein an index indicating to use the constructed affine merging predictor candidate is encoded.

19. The apparatus of claim 9, wherein the motion vector of the first spatial neighboring block used as the first control point motion vector comprises translational motion information, or wherein the motion vector of the second spatial neighboring block used as the second control point motion vector comprises translational motion information.

20. The apparatus of claim 9, wherein the motion vector of the first spatial neighboring block used as the first control point motion vector comprises affine motion information, or wherein the motion vector of the second spatial neighboring block used as the second control point motion vector comprises affine motion information.

21. The apparatus of claim 9, wherein a motion field for each position (x, y) inside the block being decoded is determined by:

$$\begin{cases} v_x = \frac{(v_{1x} - v_{0x})}{w}x - \frac{(v_{1y} - v_{0y})}{w}y + v_{0x} \\ v_y = \frac{(v_{1y} - v_{0y})}{w}x + \frac{(v_{2y1x} - v_{0x})}{w}y + v_{0y} \end{cases}$$

wherein: $(v_{0x}, v_{0y})$ corresponds to the first control point motion vector;

$(v_{1x}, v_{1y})$ corresponds to the second control point motion vector; and w is a width of the block being decoded.

22. The apparatus of claim 9, wherein an index indicating to use the constructed affine merging predictor candidate is decoded to determine the prediction of the block being decoded.

* * * * *